(12) United States Patent
Arndt

(10) Patent No.: US 10,936,036 B2
(45) Date of Patent: Mar. 2, 2021

(54) SOFT-START SWITCH CIRCUITS USING SEPARATED POWER SUPPLY PATHS AND RELATED METHODS AND SYSTEMS

(71) Applicant: Embedderment AB, Vendelsö (SE)

(72) Inventor: Niclas Arndt, Vendelsö (SE)

(73) Assignee: EMBEDDERMENT AB, Vendelsö (SE)

( * ) Notice: Subject to any disclaimer, the term of this patent is extended or adjusted under 35 U.S.C. 154(b) by 74 days.

(21) Appl. No.: 16/224,610

(22) Filed: Dec. 18, 2018

(65) Prior Publication Data

US 2019/0146564 A1 May 16, 2019

Related U.S. Application Data

(63) Continuation-in-part of application No. PCT/SE2017/050902, filed on Sep. 14, 2017.

(30) Foreign Application Priority Data

Sep. 26, 2016 (SE) .................................... 1630232-5
Feb. 6, 2018 (SE) .................................... 1830042-6

(51) Int. Cl.
*G06F 1/30* (2006.01)
*G06F 1/28* (2006.01)
(Continued)

(52) U.S. Cl.
CPC .................. *G06F 1/28* (2013.01); *G06F 1/30* (2013.01); *H02M 1/36* (2013.01); *H02J 7/0063* (2013.01)

(58) Field of Classification Search
CPC combination set(s) only.
See application file for complete search history.

(56) References Cited

U.S. PATENT DOCUMENTS 5,884,233 A * 3/1999 Brown ................. G01R 21/133
700/291
6,134,666 A * 10/2000 De Nicolo ................ G06F 1/26
713/300
(Continued)

FOREIGN PATENT DOCUMENTS

SE         1630232 A1      4/2018
WO   WO 2004/107526 A1   12/2003
(Continued)

OTHER PUBLICATIONS

TPS6218x 4-V to 15-V, 6-A, 2-Phase Step-Down Converters with AEE, Aug. 2014; Revised May 2017, Retrieved from the Internet: http://www.ti.com/lit/gpn/tps62180, 38 pages.
(Continued)

*Primary Examiner* — Raymond N Phan
(74) *Attorney, Agent, or Firm* — Sage Patent Group

(57) ABSTRACT

There is provided a soft-start switch circuit working in conjunction with a pre-existing computer power delivery system or being an integral part of such a system, for power delivery to at least one component of a computer, comprising at least one separated power supply path. The soft-start switch circuit is configured to receive command/s to activate or deactivate power delivery to the at least one computer component, output a voltage ramped up to a fixed level to the at least one computer component on the at least one separated power supply path when the activation command is received, discontinue power delivery when the deactivation command is received, and receive and transmit a signal stating whether an adequate voltage and current level is received by the at least one computer component. A corresponding method is also provided.

20 Claims, 22 Drawing Sheets

Figure 1:
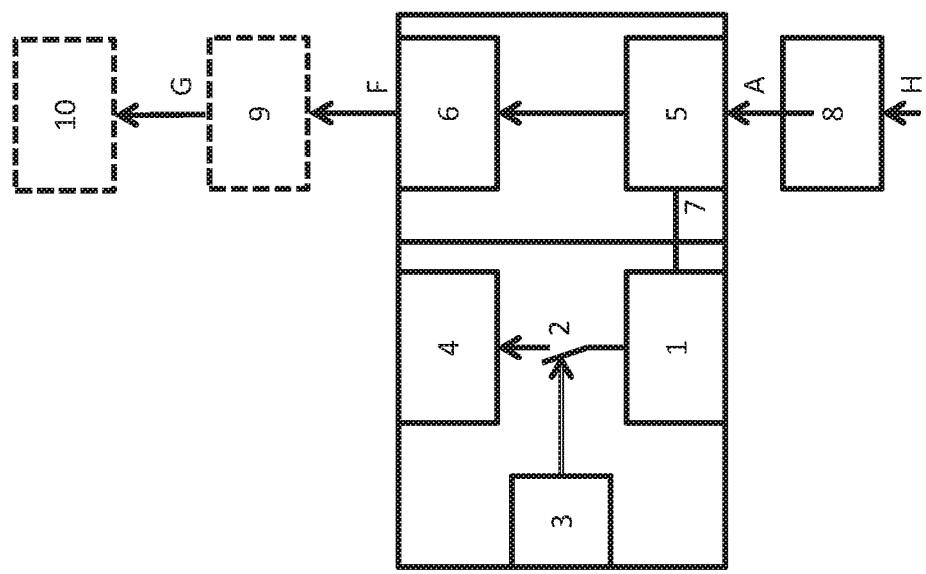

(51) Int. Cl.
*H02M 1/36* (2007.01)
*H02J 7/00* (2006.01)

(56) References Cited

U.S. PATENT DOCUMENTS

| | | | |
|---|---|---|---|
| 6,651,178 | B1 | 11/2003 | Voegeli et al. |
| 6,738,268 | B1 | 5/2004 | Sullivan et al. |
| 6,882,942 | B1 | 4/2005 | Duduman |
| 7,539,023 | B2 | 5/2009 | Bulucea |
| 8,878,390 | B2 | 11/2014 | Lorentzen |
| 9,223,371 | B2 | 12/2015 | Lorentzen |
| 2005/0105237 | A1 | 5/2005 | D'Amato |
| 2005/0105307 | A1 | 5/2005 | Shearon et al. |
| 2005/0270804 | A1* | 12/2005 | Liu .................. H02M 1/36 363/16 |
| 2007/0109702 | A1 | 5/2007 | Chen et al. |
| 2010/0052426 | A1* | 3/2010 | Carter .................. G06F 1/26 307/64 |
| 2015/0052277 | A1 | 2/2015 | Lorentzen |
| 2016/0359422 | A1* | 12/2016 | Yuan .................. H02M 1/36 |

FOREIGN PATENT DOCUMENTS

| WO | WO-2010-151261 A1 | 12/2010 |
|---|---|---|
| WO | WO-2018-056882 A1 | 3/2018 |

OTHER PUBLICATIONS

Convert ATX PSU to Bench Supply, Sep. 2016. Retrieved from the Internet: http://www.electronics-tutorials.ws/blog/convert-atx-psu-tobench-supply.html, 12 pgs.
Glossary Power-brick. Retrieved from the Internet, Dec. 18, 2018: https://www.sunpower-uk.com/glossary/power-brick; 4 pgs.
SE Patent Application No. 1630232-5, First Office Action dated Apr. 10, 2017, 9 pgs.
SE Patent Application No. 1630232-5, Search Report dated Apr. 10, 2017, 9 pgs.
International Search Report and Written Opinion prepared by the Patent-och registreringsverket as International Searching Authority for PCT International Patent Application No. PCT/SE2017/050902 dated Nov. 23, 2017, 12 pgs.
SE Patent Application No. 1630232-5, Second Office Action dated Nov. 24, 2017, 5 pgs.
SE Patent Application No. 1630232-5, Third Office Action dated Feb. 6, 2018, 5 pgs.
SE Patent Application No. 1630232-5, Intent to Grant dated Mar. 28, 2018, 4 pgs.
SE Patent Application No. 1830042-6, First Office Action dated Sep. 25, 2018, 3 pgs.
SE Patent Application No. 1830042-6, Search Report dated Sep. 25, 2018, 2 pgs.

* cited by examiner

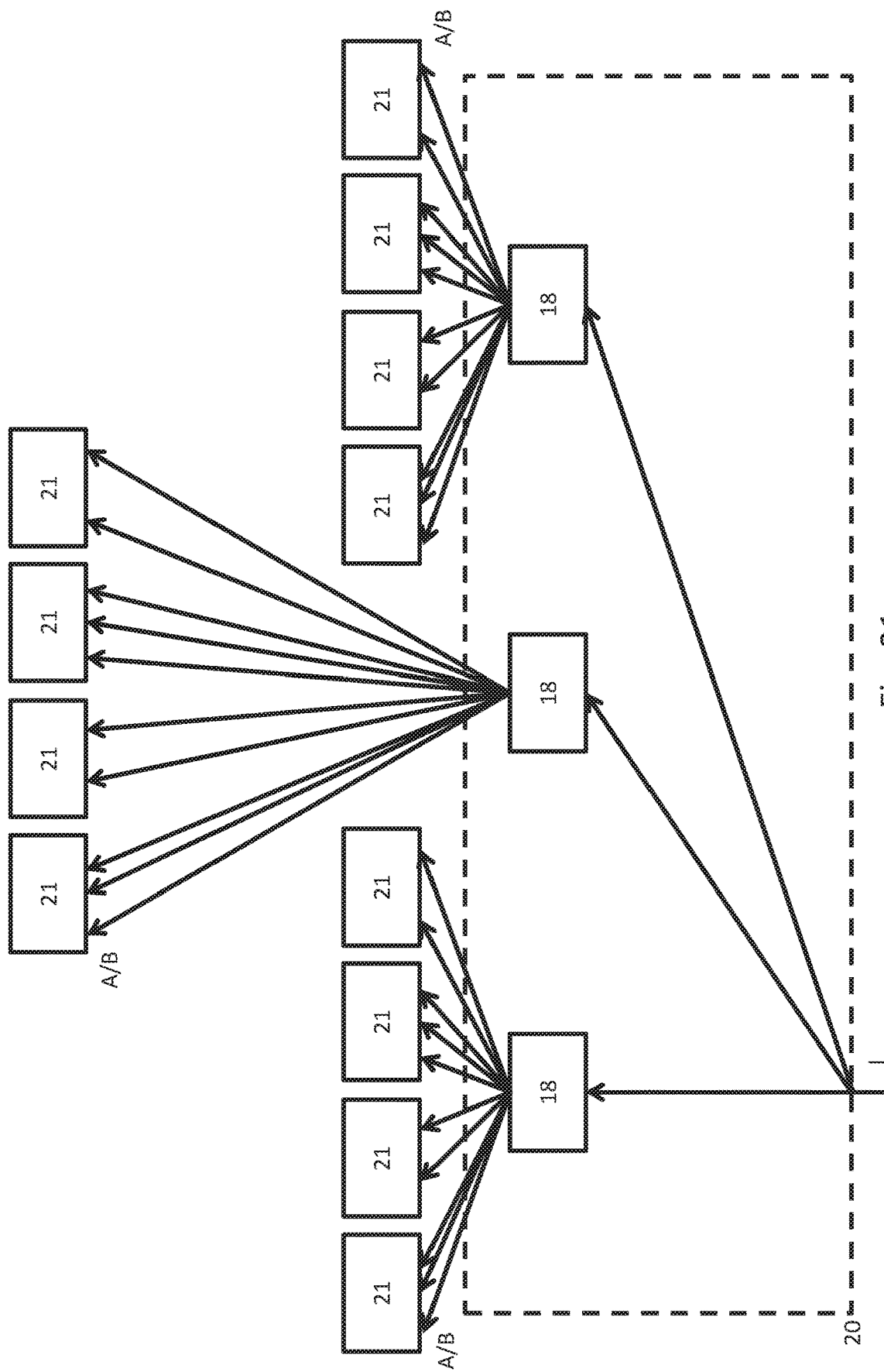

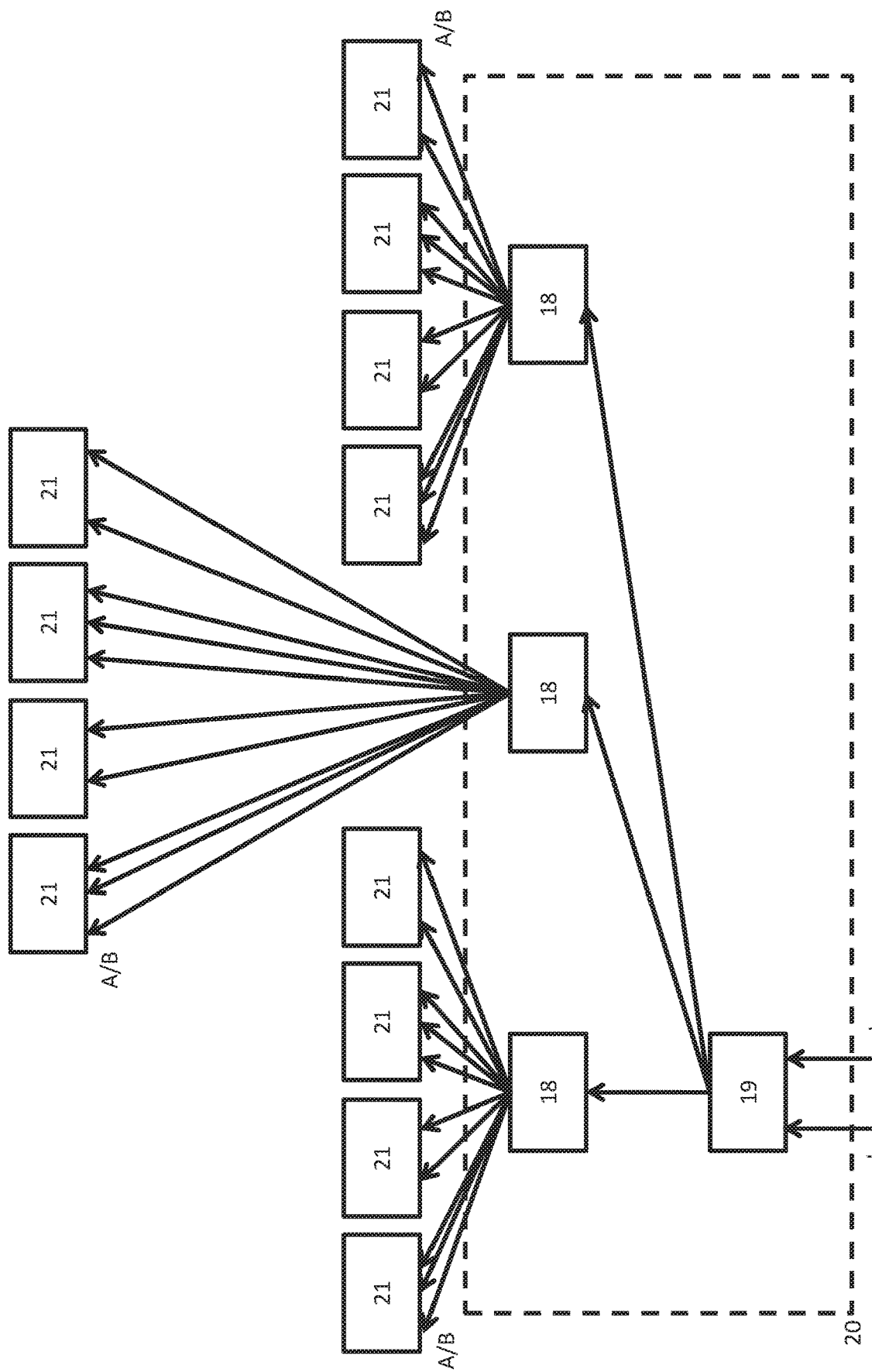

SOFT-START SWITCH CIRCUITS USING SEPARATED POWER SUPPLY PATHS AND RELATED METHODS AND SYSTEMS

1. RELATED PATENT APPLICATIONS AND PATENTS

The present application is a continuation-in-part of PCT/SE2017/050902 filed Sep. 14, 2017 and published as WO 2018/056882 A1 on Mar. 29, 2018, entitled, "Soft Circuit Switch, Method Therein and System," (the "'902 Application), which claims the benefit of SE 1630232-5 filed Sep. 26, 2016 and entitled, "Modularization and Starvation Prevention in High-Current Computer Power Delivery Systems," the entire teachings of which are incorporated herein by reference in their entirety. The present application also claims the benefit of SE 1830042-6, filed Feb. 6, 2018, the entire teachings of which are incorporated herein by reference in their entirety.

2. TECHNICAL FIELD

The present disclosure relates to a soft-start switch circuit, an associated modular power delivery system used for one or a plurality of computer/s, and a corresponding method. The present disclosure also relates to an adapter board associated with the soft-start switch circuit.

3. BACKGROUND

There are four main consumers of power in today's computer:
1. Motherboard: 3.3 V, 5 V stand-by, 5 V, 12 V, and −12 V fed into the 20- or 24-pin power connector on the motherboard
2. Motherboard: 12 V fed into a 4- or 8-pin power connector on the motherboard. This input often supplies power to the CPU and the PCI Express bus.
3. Graphics adapter: A gaming PC or graphics workstation needs a significant amount of 12 V power fed into one or a few 6- or 8-pin power connectors on the graphics adapter.
4. Hard drives and other peripherals: A suitable combination of 3.3 V, 5 V, and 12 V fed into one or more hard drives. For a file server with mechanical drives, a great deal of power is needed for the 12 V rail, especially at spin-up.

For the range of computers most relevant to embodiments disclosed here, the graphics adapter is the main consumer, followed by the motherboard CPU input. For file servers, the main consumer is the set of mechanical hard drives that in particular require much current on the 12 V rail when spinning up.

The power delivery system should meet the following requirements:
I. Facilitate synchronized turn-on and turn-off.
II. Meet rise-time and rise-order requirements for the rails.
III. Monitor the quality of the power delivered on every rail.
IV. Provide emergency shutdown of the entire system in case of a failure condition.
V. Provide power to either all rails or no rails (except for the 5 V stand-by).

The equipment might break if this is not enforced.

IEC 60950-1:2005 defines hazardous energy level as "available power level of 240 VA or more, having a duration of 60 s or more, or a stored energy level of 20 J or more (for example, from one or more capacitors), at a potential of 2 V or more" (definition 1.2.8.10). It is thus desirable (although not absolutely necessary) to design for less than 240 VA, which in this document is referred to as "the 240 VA limitation".

The ATX and derived standards specify two signals for communication between the motherboard and the PSU, found on the 20- or 24-pin motherboard power connector:

PS_ON#: To start and run the computer, the motherboard shorts this signal to ground, which causes the PSU to turn on the 3.3 V, 5 V, 12 V, and −12 V rails. (5 V stand-by is always on.) When this signal is connected to 5 V stand-by or open-circuited (thereby left pulled-up to 5 V stand-by), the PSU must turn off all rails except 5 V stand-by.

PWR_OK: The PSU stops shorting this signal to ground (thereby letting it be pulled up to 5 V stand-by) when the power is good on all rails. This tells the motherboard that it is safe to boot up and maintain normal operation. The PSU shorts this signal to ground in case of a failure condition (i.e. power is no longer good) which causes the motherboard to stop operating.

If PWR_OK goes low while PS_ON# is low, this is an alert of a failure condition to the rest of the modular power delivery system.

4. SUMMARY

There is provided a soft-start switch circuit working in conjunction with a pre-existing computer power delivery system or being an integral part of such a system, for power delivery to at least one component of a computer, comprising at least one separated power supply path. The soft-start switch circuit is configured to receive command/s to activate or deactivate power delivery to the at least one computer component, output a voltage ramped up to a fixed level to the at least one computer component on the at least one separated power supply path when the activation command is received, discontinue power delivery when the deactivation command is received, and receive and transmit a signal stating whether an adequate voltage and current level is received by the at least one computer component.

The is also provided a method by which a soft-start switch circuit, working in conjunction with a pre-existing computer power delivery system or being an integral part of such a system, is used for power delivery to at least one component of a computer, comprising at least one separated power supply path. The method comprises receiving command/s to activate or deactivate power delivery to the at least one computer component, outputting a voltage ramped up to a fixed level to the at least one computer component on the at least one separated power supply path when the activation command is received, discontinuing power delivery when the deactivation command is received, and receiving and transmitting a signal stating whether an adequate voltage and current level is received by the at least one computer component.

5. BRIEF DESCRIPTION OF THE DRAWINGS

See the detailed description for explanations of the terminology employed herein.

Figure 2:
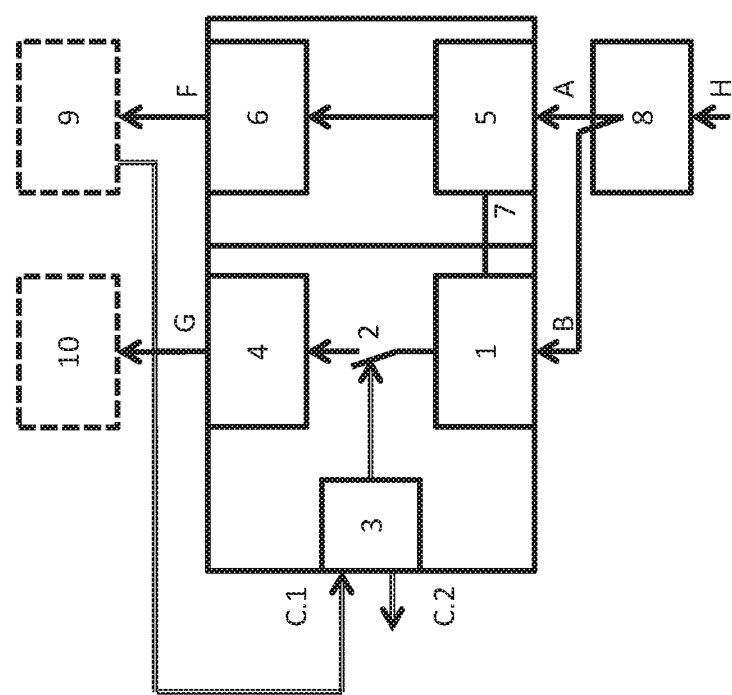
Figure 3:
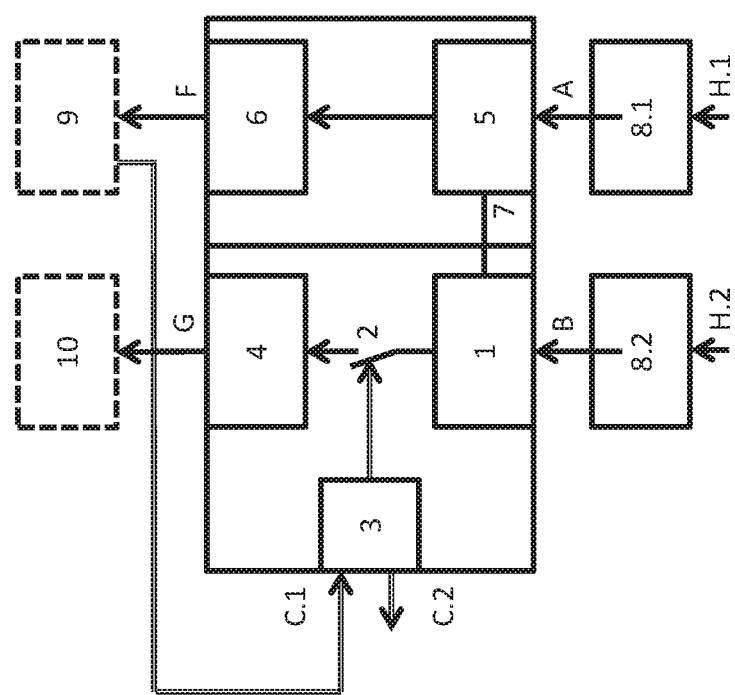

FIG. 1. DC_PSU_M using an AO board for the pass-through function only. This is an example of an entry-level configuration for a GAC1 (GAC1-GAC5 are explained in the detailed description) through GAC3 gaming computer that is prepared for easy upgrade to support a more powerful graphics adapter (FIG. 2 or 3). With a DC_PSU_L this supports GAC1 and some GAC2 graphics adapters.

FIG. 2. DC_PSU using an AO board both for pass-through and for soft-start switching of power to a GAC3 through GAC5 graphics adapter. In this example it is powered by one common PB with two sets of cabling (GAC3 or GAC4) or three sets (GAC5).

FIG. 3. DC_PSU using an AO board both for pass-through and for soft-start switching of power to a GAC3 through GAC5 graphics adapter. In this example it is powered by two separate PBs with one set (DC_PSU) and one or two sets (graphics adapter) of cabling each. This is an example of re-use of pre-existing equipment.

Figure 4:
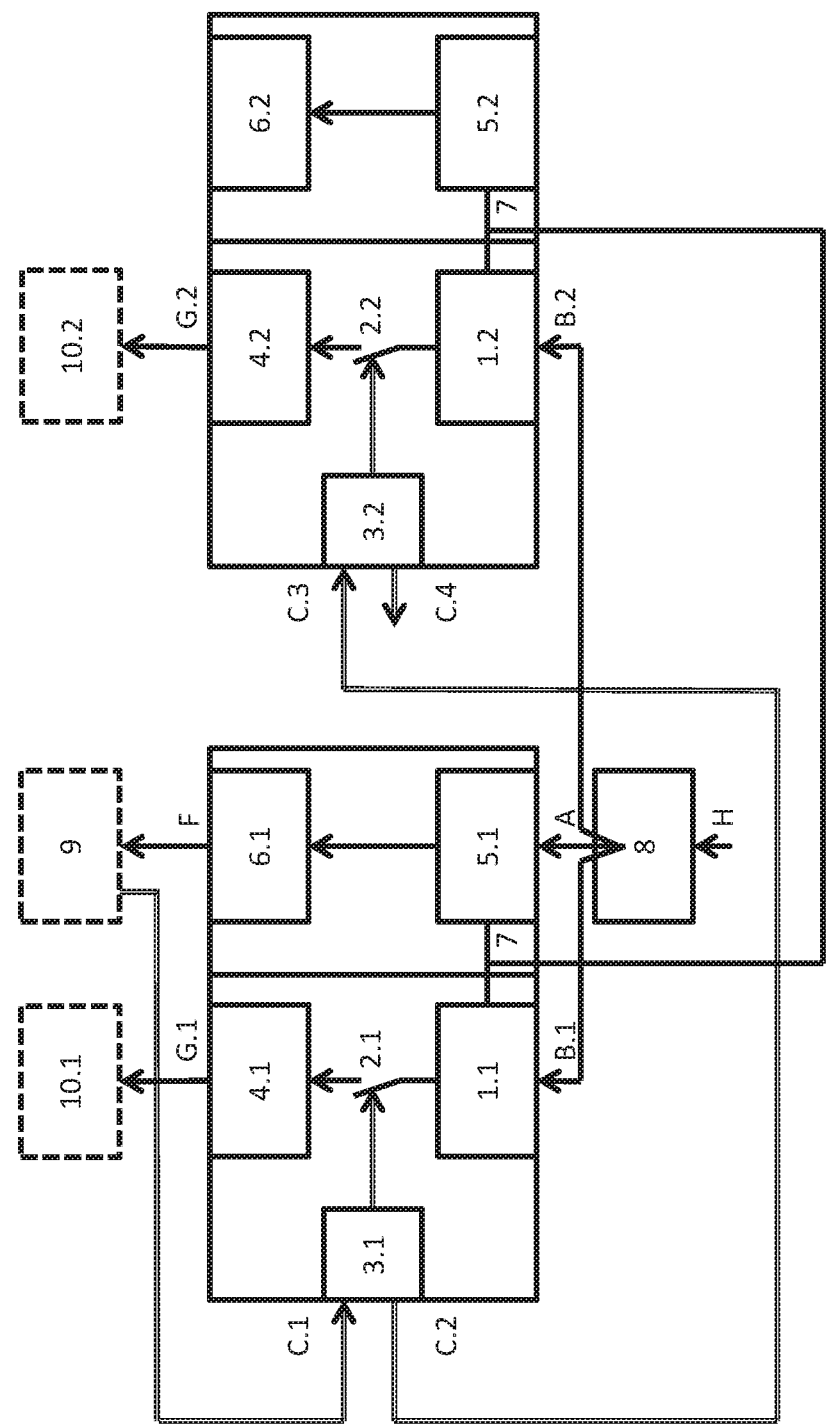

FIG. 4. DC_PSU using two AO boards, one of which for pass-through and both for soft-start switching of power to one GAC3 through GAC5 graphics adapter each, in Scalable Link Interface (SLI) or Cross-Fire configuration. In this example it is powered by one common PB with three sets of cabling (GAC3 or GAC4) or five sets (GAC5).

Figure 5:
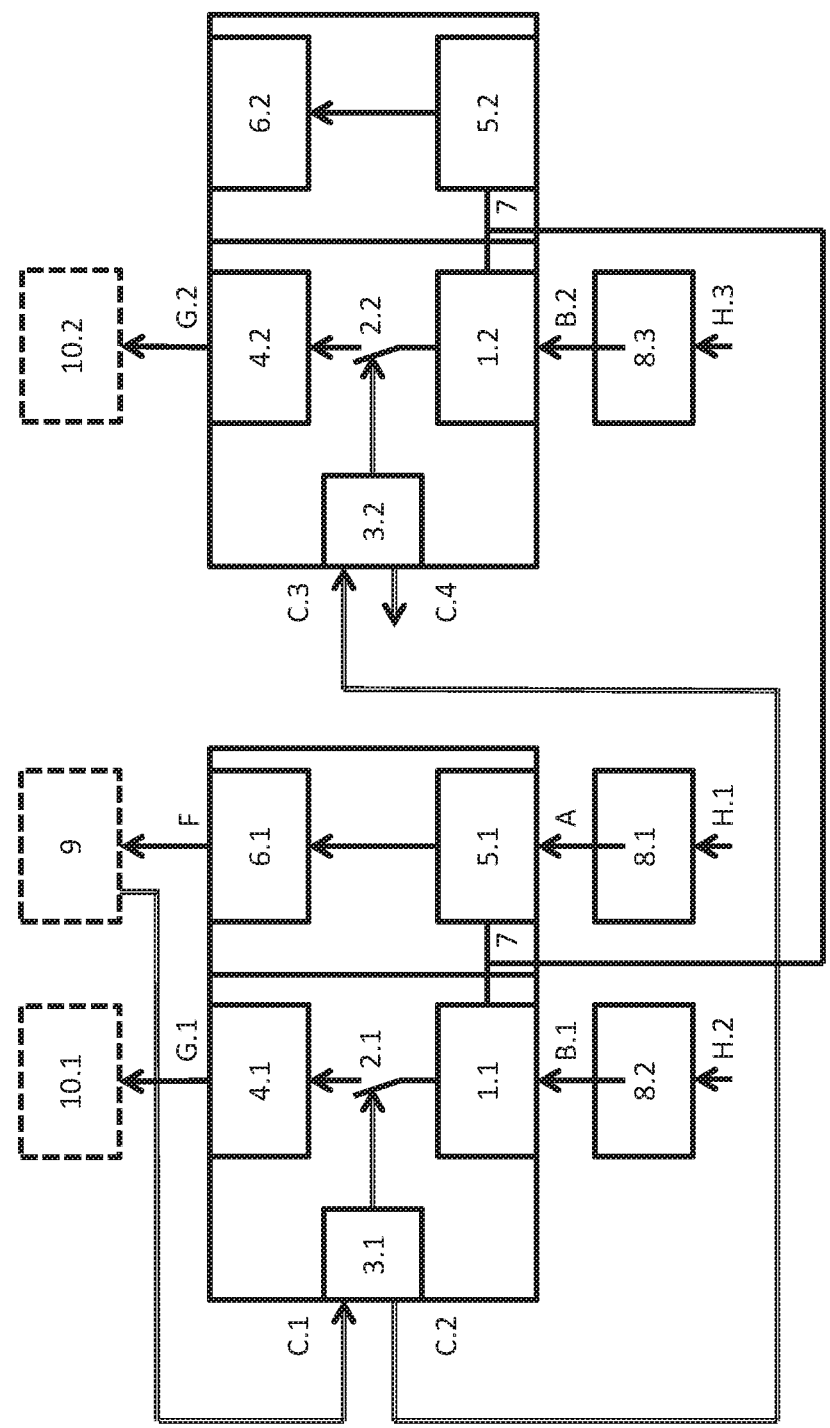

FIG. 5. DC_PSU using two AO boards, one of which for pass-through and both for soft-start switching of power to one high-end graphics adapter each, in Scalable Link Interface (SLI) or Cross-Fire configuration. In this case it is powered by three separate PBs with one or two sets of cabling each. This is an example of re-use of pre-existing equipment, possibly an upgrade from FIG. 3.

Figure 6:
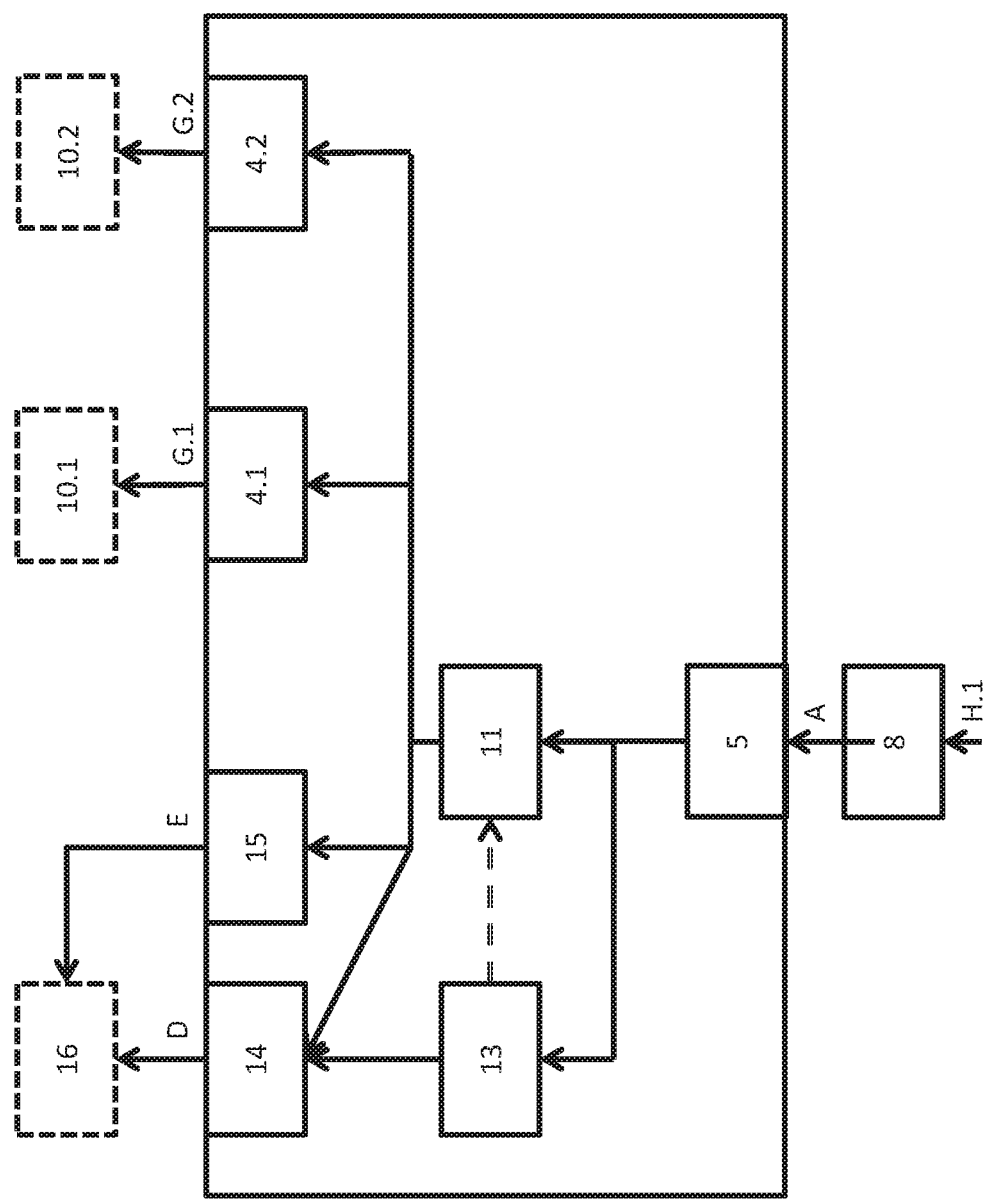

FIG. 6. Example of alternative solution with DC/DC converter (11) that generates 12 V for graphics adapter(s), motherboard 12 V connector, and motherboard 20- or 24-pin ATX connector. A second DC/DC converter block (13) generates the rest of the DC_PSU voltages (5 V stand-by, 5 V, 3.3 V, and −12 V). It only incorporates soft-start switching of the 5 V rail. The 12 V output is inherently soft-started by the DC/DC converter (as is the 3.3 V output). It is powered by one single PB at 24 to 48 V. It is not in compliance with a requirement in standards IEC/EN/UL/CSA 60950 that limits the maximum possible power that may pass in a wire to 240 VA. It could be further equipped with Over-Current Protection (OCP) on each output rail, each signaling "power good" to the entire power delivery system. This would be in compliance with the 240 VA limitation.

Figure 7:
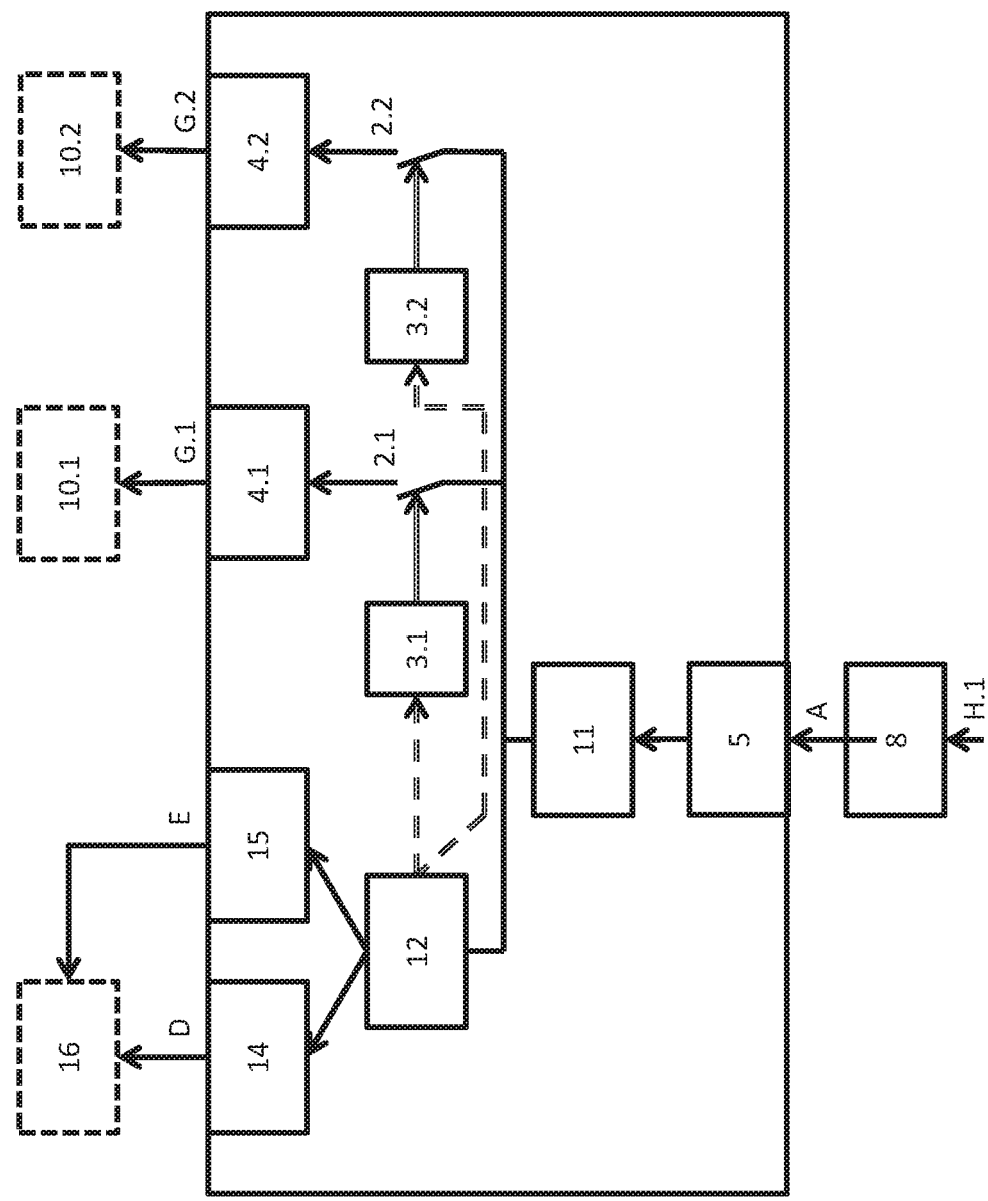

FIG. 7. Example of a modification to FIG. 6 that complies with the 240 VA limitation. There is a soft-start switch circuit on every 12 V output.

Figure 8:
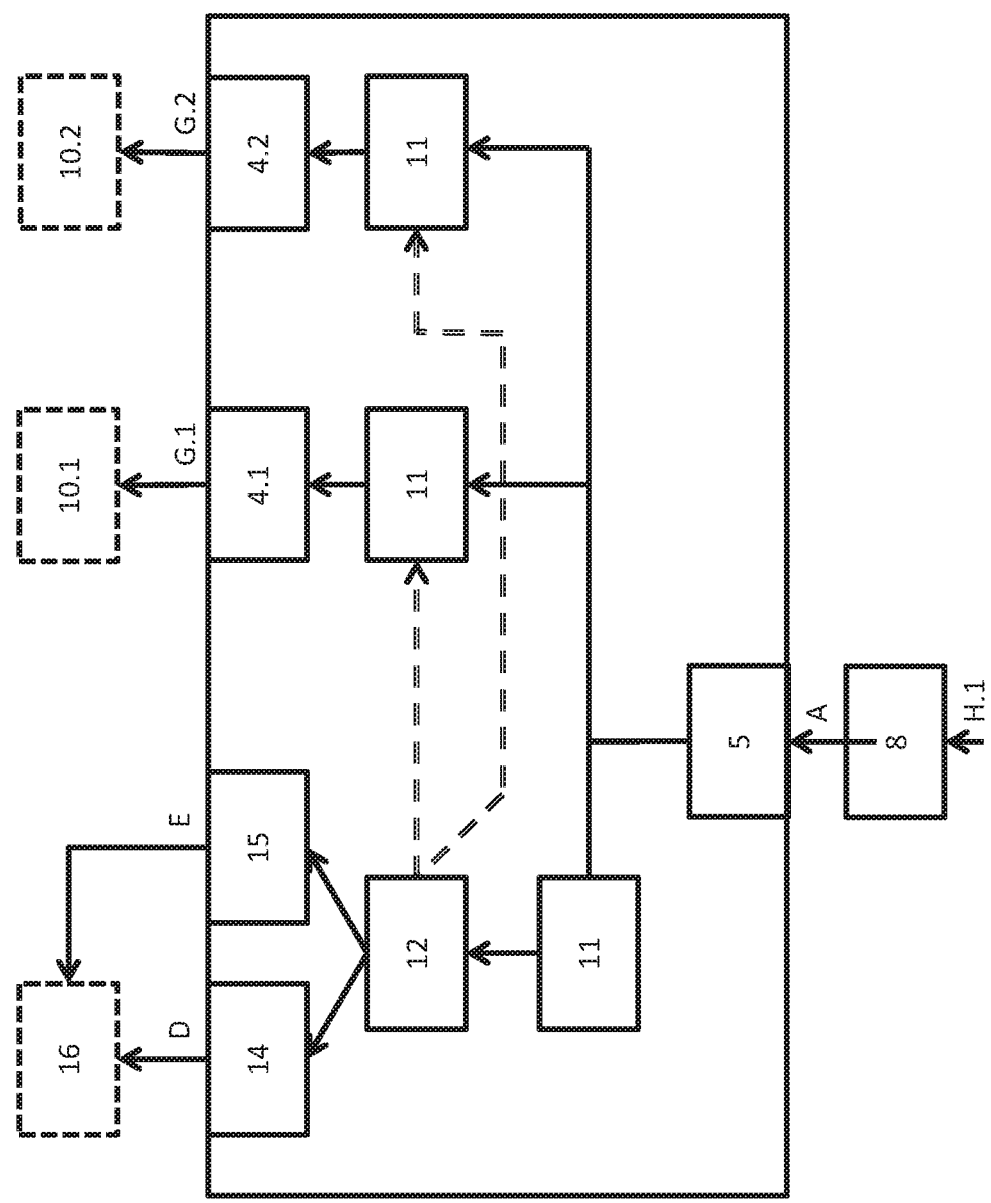

FIG. 8. Example of a modification to FIG. 6 in which the common 12 V DC/DC converter has been broken up into several ones, each limited to 240 VA and inherently soft-started.

Figure 9:
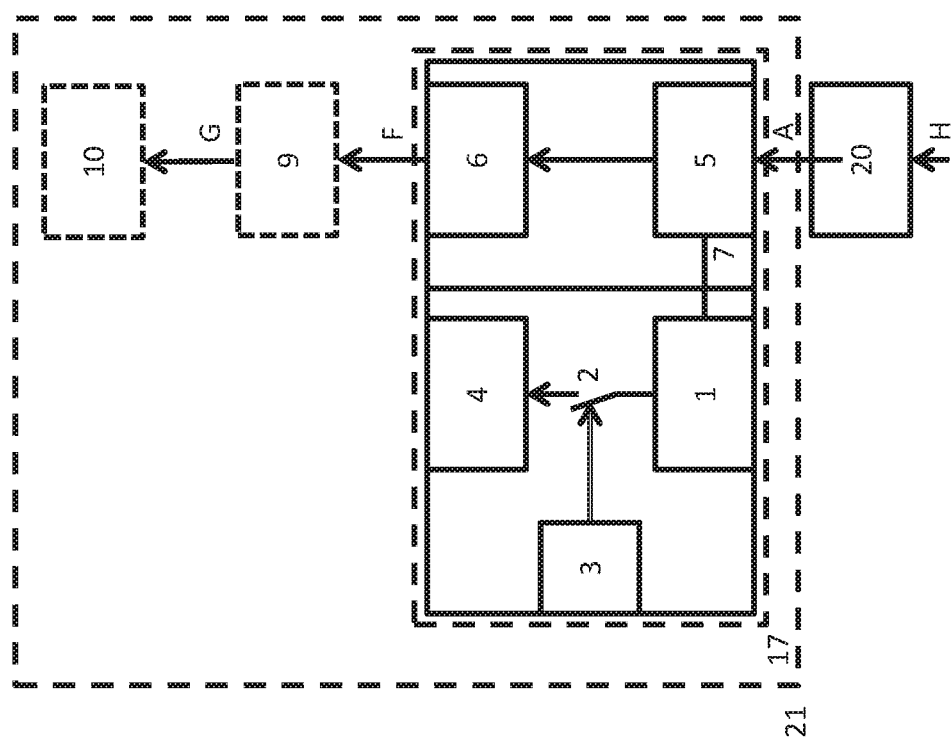

FIG. 9. DC_PSU_M (9) using an AO board (17) for the pass-through function (A to F) only. This is an example of an entry-level configuration for an aspect A (aspects A and B are explained in the detailed description) GAC1 through GAC3 gaming computer that is prepared for easy upgrade to support a more powerful graphics adapter (FIG. 2 or 3). With a DC_PSU_L (9) this supports GAC1 and some GAC2 graphics adapters.

Figure 10:
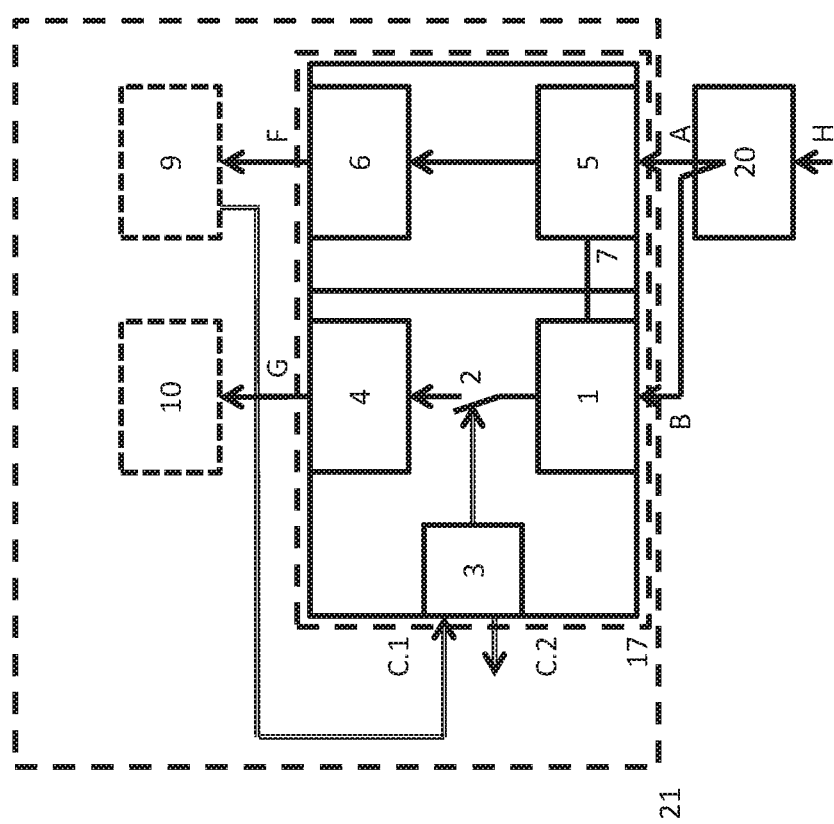

FIG. 10. DC_PSU (9) using an AO board (17) both for pass-through (A to F) and for soft-start switching (2) of power to an aspect A GAC3 through GAC5 graphics adapter. In this example it is powered by one common PB (8) with two sets of cabling (GAC3 or GAC4) or three sets (GAC5).

Figure 11:
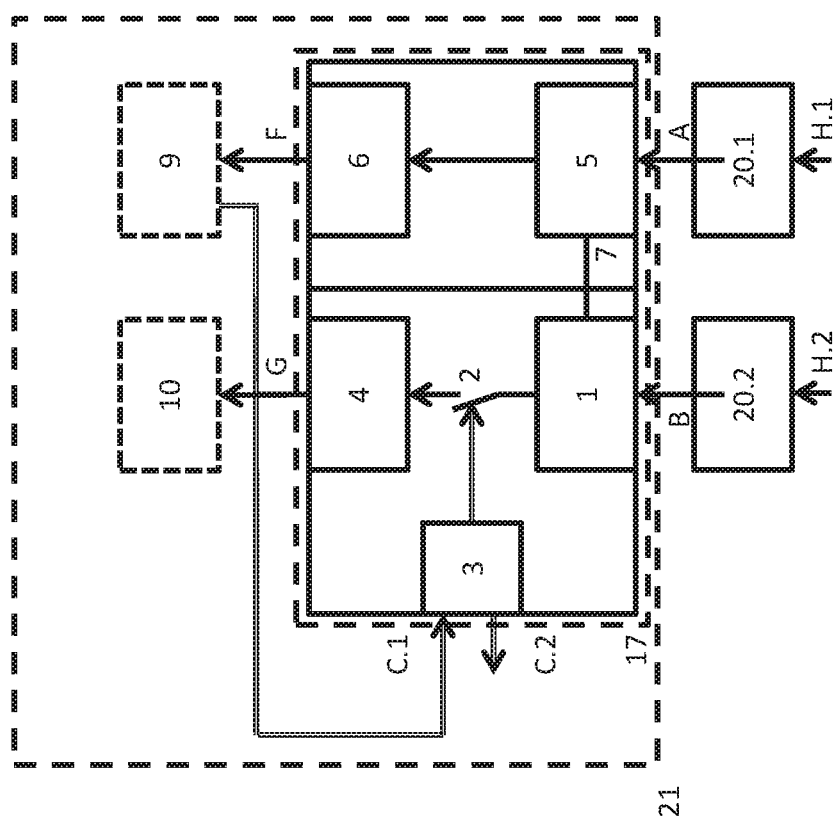

FIG. 11. DC_PSU (9) using an AO board (17) both for pass-through (A to F) and for soft-start switching (2) of power to an aspect A GAC3 through GAC5 graphics adapter. In this example it is powered by two separate PBs (8.1 and 8.2) with one set (DC_PSU (9)) (F) and one or two sets (graphics adapter (10)) (G) of cabling each. This is an example of re-use of pre-existing equipment.

Figure 12:
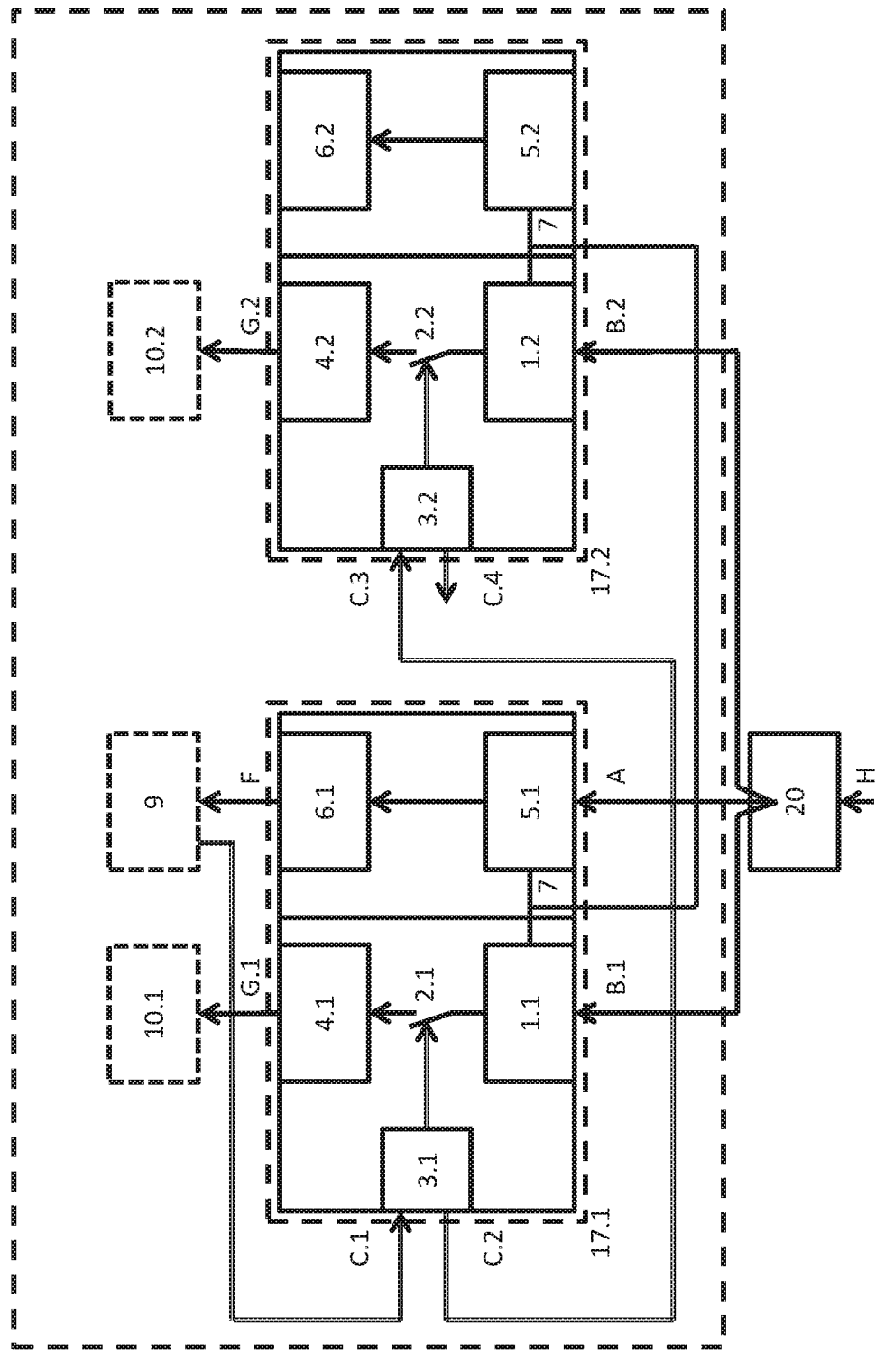

FIG. 12. DC_PSU (9) using two AO boards (17.1 and 17.2), one of which for pass-through (A to F) and both for soft-start switching (2) of power to one aspect A GAC3 through GAC5 graphics adapter each, in Scalable Link Interface (SLI) or Cross-Fire configuration. In this example it is powered by one common PB (8) with three sets of cabling (GAC3 or GAC4) or five sets (GAC5).

Figure 13:
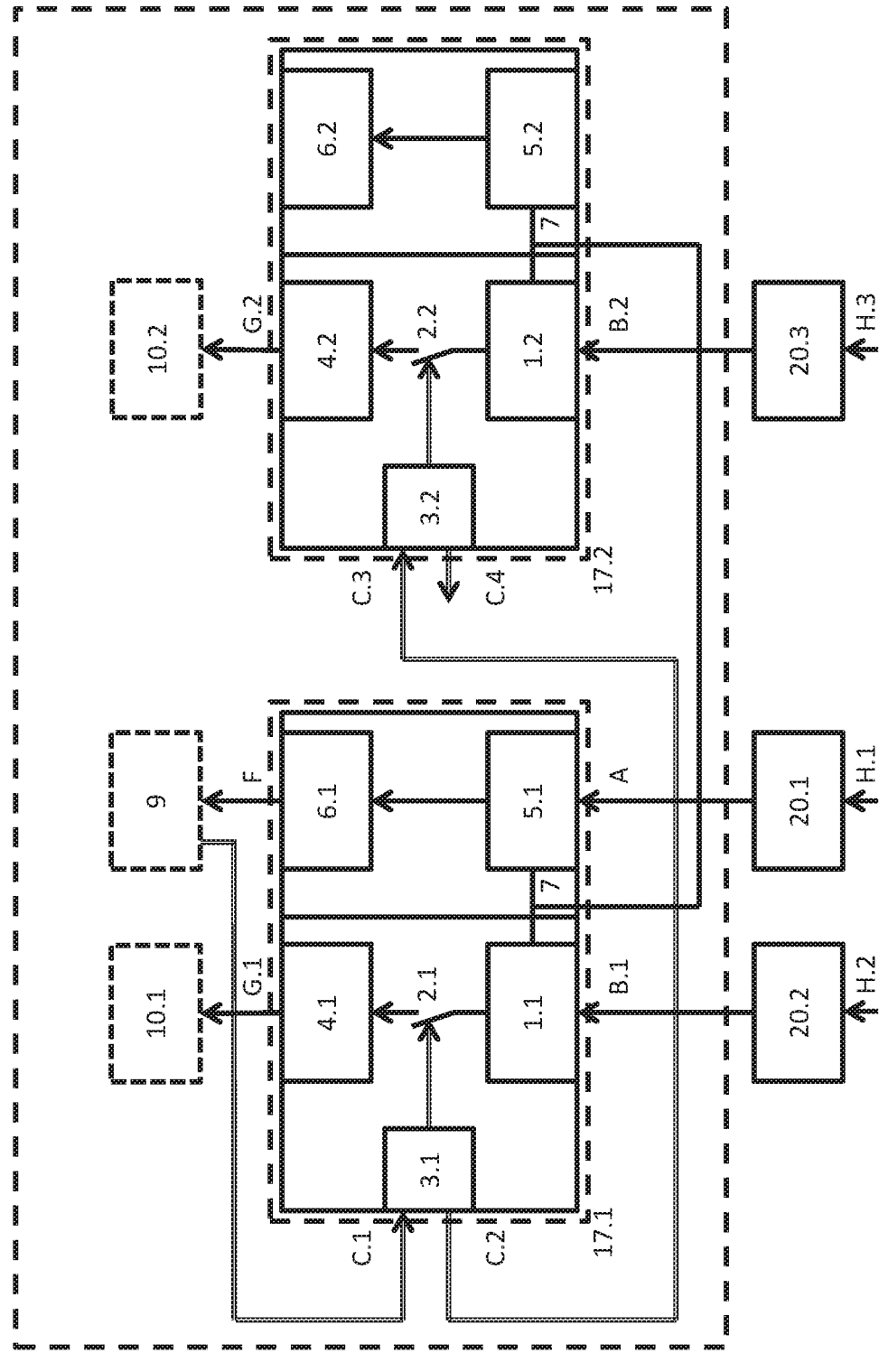

FIG. 13. DC_PSU (9) using two AO boards (17.1 and 17.2), one of which for pass-through (A to F) and both for soft-start switching (2) of power to one high-end graphics adapter (10) each, in Scalable Link Interface (SLI) or Cross-Fire configuration. In this case it is powered by three separate PBs (8.1, 8.2, and 8.3) with one or two sets of cabling each. This is an example of re-use of pre-existing equipment, possibly an upgrade from FIG. 11.

Figure 14:
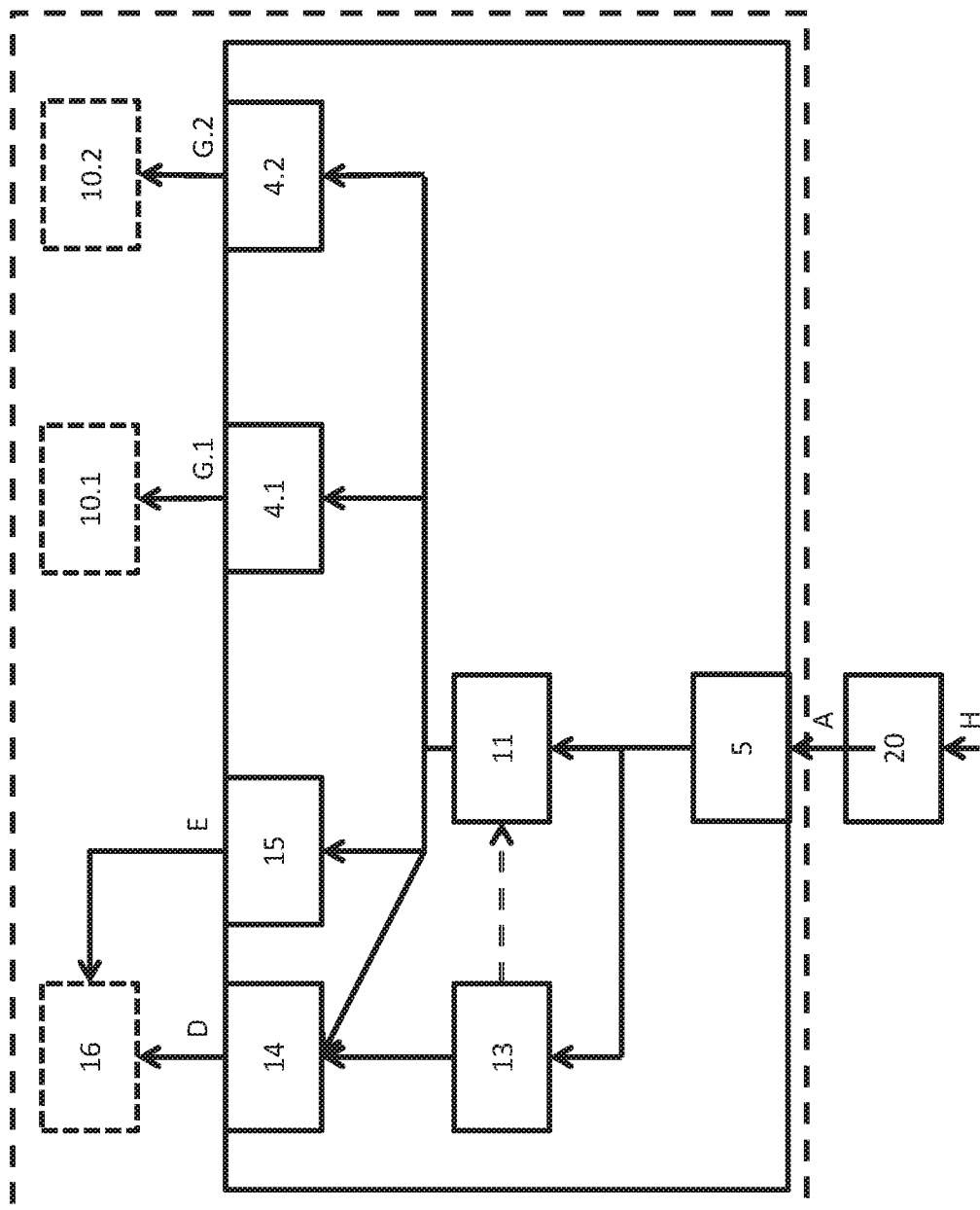

FIG. 14. Example of alternative solution with DC/DC converter (11) that generates 12 V for graphics adapter(s) (10.1 and 10.2), motherboard 12 V connector (15), and motherboard 20- or 24-pin ATX connector (14). A second DC/DC converter block (13) generates the rest of the DC_PSU voltages (5 V stand-by, 5 V, 3.3 V, and −12 V). It only incorporates soft-start switching (2) of the 5 V rail. The 12 V output is inherently soft-started by the DC/DC converter (as is the 3.3 V output). It is powered by one single PB (8) at 24 to 48 V. It is not in compliance with the 240 VA limitation. It could be further equipped with Over-Current Protection (OCP) on each output rail, each signaling "power good" to the entire power delivery system. This would be in compliance with the 240 VA limitation.

Figure 15:
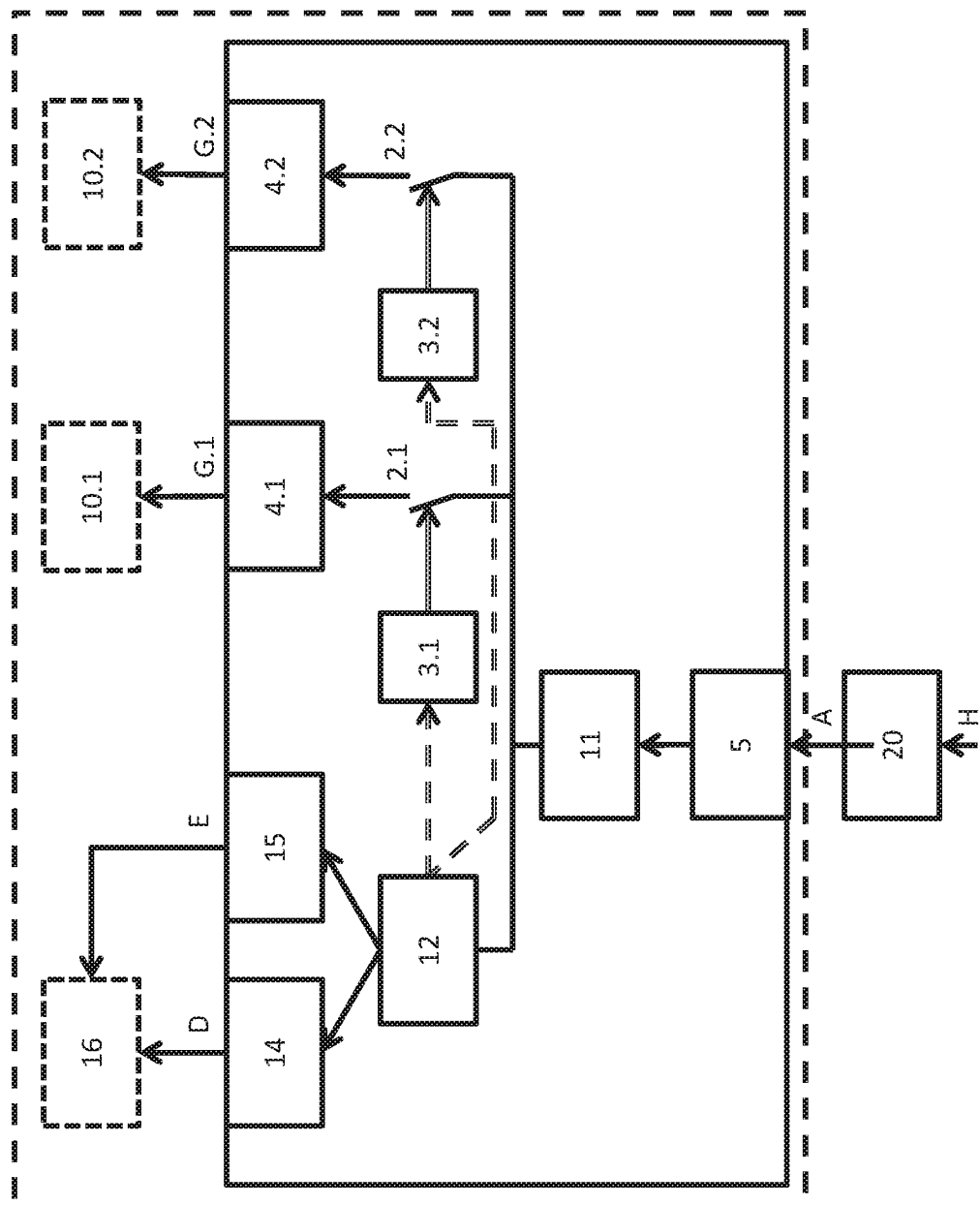

FIG. 15. Example of a modification to FIG. 14 that complies with the 240 VA limitation. There is a soft-start switch circuit (2.1 and 3.1, & 2.2 and 3.2) on every 12 V output (4.1 and 4.2).

Figure 16:
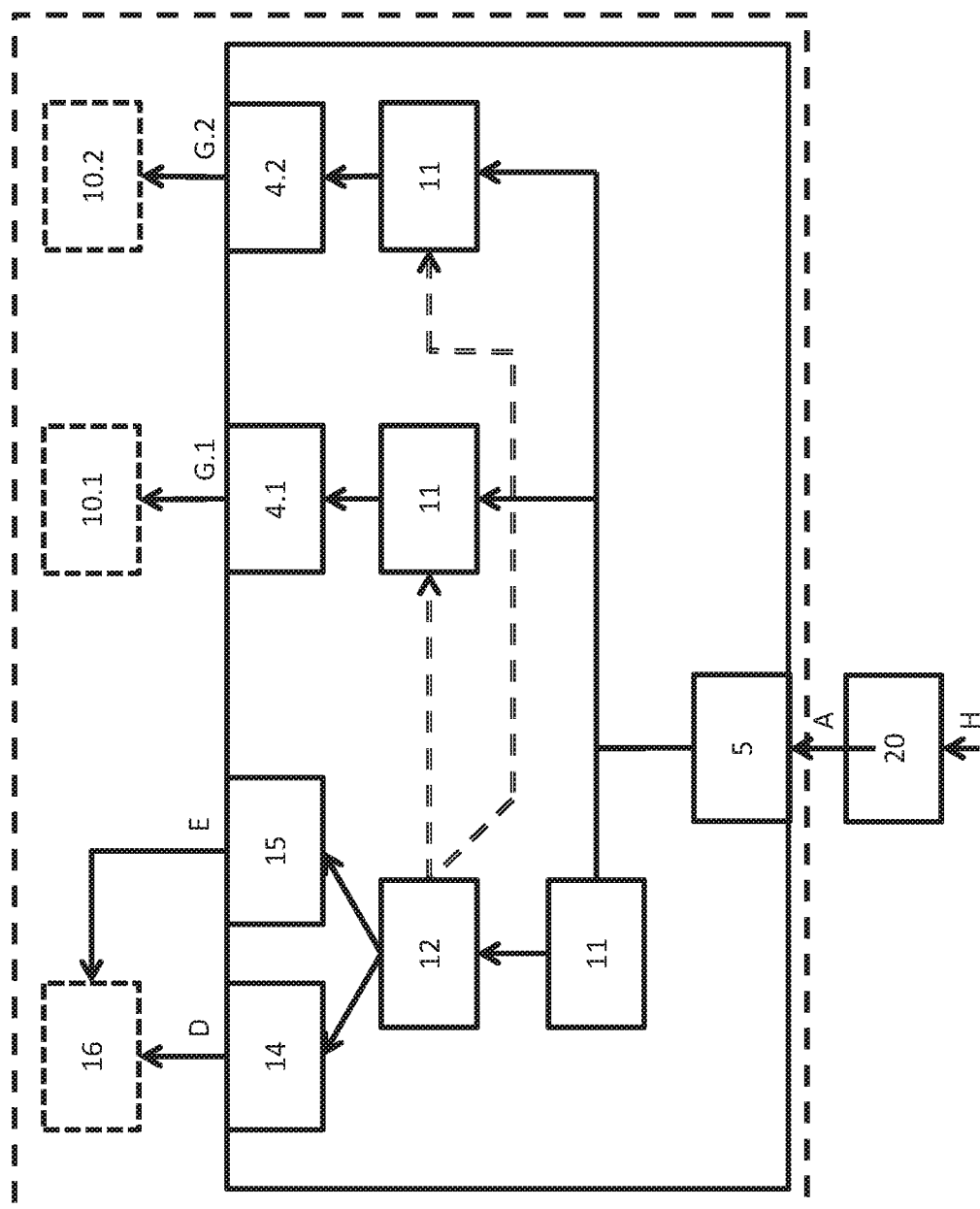

FIG. 16. Example of a modification to FIG. 14 in which the common 12 V DC/DC converter has been broken up into several ones (11), each limited to 240 VA and inherently soft-started.

Figure 17:
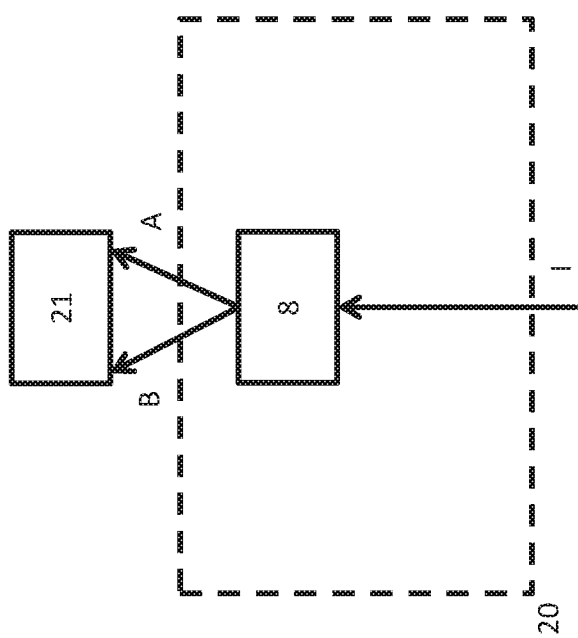

FIG. 17. The equivalent to FIG. 10 with the nomenclature used for aspect B.

Figure 18:
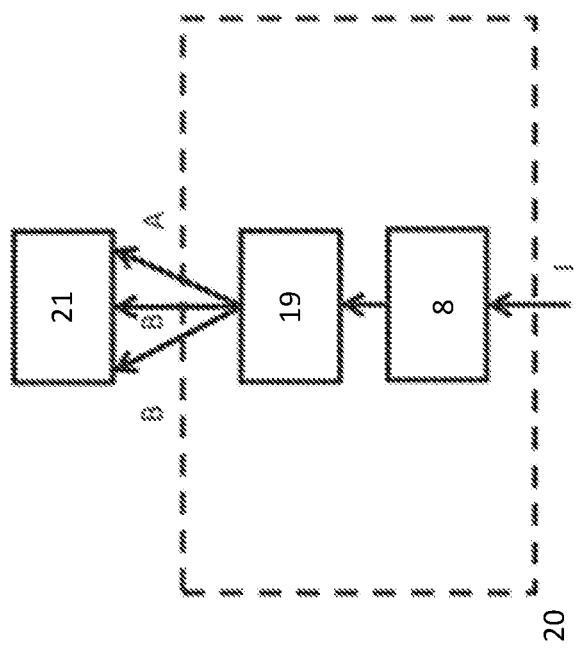

FIG. 18. Example of the equivalent to FIG. 12 with an additional BPS (19), in this case fed from AC.

Figure 19:
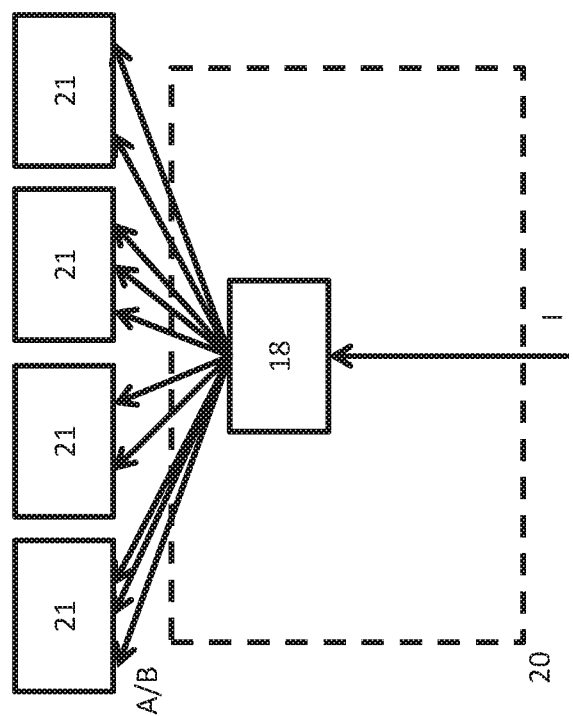

FIG. 19. Example of feeding a plurality of computer systems from a CPB (18), here fed from AC.

Figure 20:
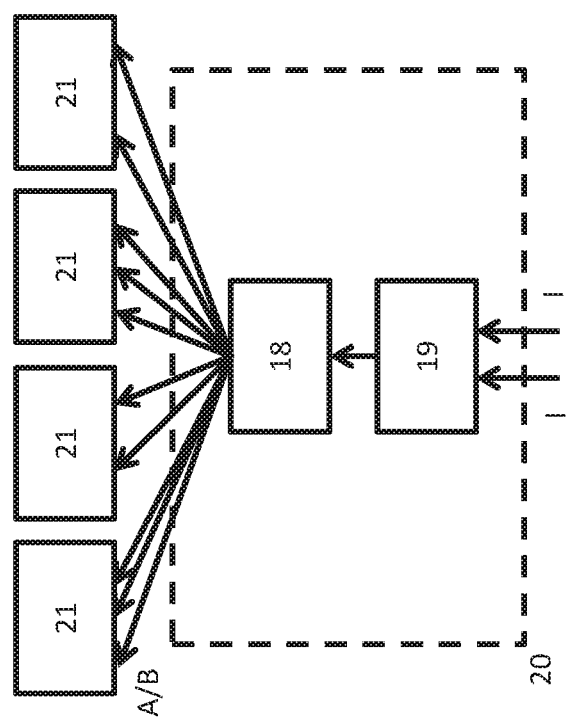

FIG. 20. Example of adding a BPS (19) to FIG. 19 and feeding it from both AC and a generator.

FIG. 21. Example of a plurality of CPBs (18) fed from AC or a 48 V DC rail.

FIG. 22. Example of a plurality of CPBs (18) running on 48 V DC fed by an additional BPS (19) fed from both AC and a generator.

6. DETAILED DESCRIPTION

6.1 Regarding Aspects A and B Disclosed Herein

The abovementioned Swedish patent application No. SE 1630232-5 (which is incorporated herein by reference in its entirety) presents a design of a modular power supply, which when used with a power brick forms a power delivery system that makes it possible to build very small and powerful gaming computers, graphical workstations, and file servers. The approach proposed in Swedish patent application No. SE 1630232-5 is referred to as "aspect A" in the present disclosure.

Aspect A is drawn from the insight that the power handling capability can be increased as much as necessary so long as starvation (between loads) is avoided. This may be achieved by soft-start switched power path/s separated all the way back to (or close to) the output stage/bulk capacitors of the power brick/s or to the power conversion stage/s immediately inside the computer chassis. Where needed in order to avoid starvation between loads, each load gets its power from a separate path.

The abovementioned Swedish patent application No. SE 1830042-6 (which is incorporated herein by reference in its entirety) relates to power sources alternative to the generic AC/DC power brick (PB) that is natural for Aspect A. The approach proposed in Swedish patent application No. SE 1830042-6 is referred to as "aspect B" in the present disclosure.

While one or a plurality of PBs (8) can be used to power one single computer system, it is equally possible to power one or a plurality of computer systems from one common power bank (CPB) (18), which in its turn can be fed from a DC supply, an AC supply, a generator, or a battery power source (BPS) (19) as described below. This has great practical value for computer/server farms.

Regardless of the number of DC power sources (20) and computer systems (21), the ability to use a BPS (19) either as stand-alone battery/s with regulated DC output or as a battery-backed DC/DC or AC/DC power source (possibly also fed from a generator) (commonly referred to as an Uninterruptible Power Supply (UPS)) is expected to be very useful both for individual computers/file servers and for CPBs (18).

It should be appreciated that some embodiments will include the features of Aspect A, some will include the features of Aspect B, and some will include the features of both. Unless explicitly stated herein, no single feature is required by every embodiment.

6.2 Terminology and Definitions

All voltages are referred to by their nominal value. For example, for this application, 12 V generally means the range of 11.4 V to 12.6 V or 10.8 V to 13.2 V.

6.2.1 Classification of Graphics Adapters
  GAC1. Graphics adapter integrated in the CPU or on the motherboard
  GAC2. Graphics adapter powered entirely from the PCI-Express bus (<=75 W)
  GAC3. Graphics adapter powered from PCI-Express bus and one 6-pin 12 V connector
  GAC4. Graphics adapter powered from PCI-Express bus and one 8-pin 12 V connector
  GAC5. Graphics adapter powered from PCI-Express bus and multiple 6- or 8-pin 12 V connectors The above classes (defined by the inventor) are not set in stone. E.g., nVidia's current line of graphics adapters is specified as follows, however many of the manufacturers design for overclocking and add additional connectors:
  GTX 1060: 120 W using one 6-pin connector
  GTX 1070: 150 W using one 8-pin connector
  GTX 1080: 180 W using one 8-pin connector Both the 6- and 8-pin connectors have 2 pins dedicated to signaling to the graphics adapter how much power the PSU can supply on each connector. In other words, only 2+2 or 3+3 pins actually carry the load current. (Half of the pins carry +12 V and the other half carries power ground.)

Aspect A is mainly relevant for GAC3 through GAC5.
6.2.2 Devices
  PSU: General term for a power delivery system.
  AC_PSU (not depicted): The traditional metal box AC/DC switching power supply that is mounted inside the computer chassis. It comes in a variety of formats, conforming to one of the ATX-related standards (ATX, SFX, TFX, CFX, LFX, Flex ATX, or other). It typically supplies 3.3 V, 5 V stand-by, 5 V, 12 V, and −12 V. It does not have a dedicated control and monitoring connector with the required signals, so an adapter board should be used when connecting an AC_PSU to embodiments of aspects A or B of the present disclosure (not depicted).
  DC_PSU (9): A general term for a DC/DC switching power supply fed by 6 V to 48 V (typically 12 V). It typically supplies 3.3 V, 5 V stand-by, 5 V, 12 V, and −12 V.
  DC_PSU_L (9): A legacy DC_PSU that (for obvious reasons) was not designed for interaction with embodiments of aspects A or B of the present disclosure. It does not have a dedicated control and monitoring connector with the required signals, so an adapter board should be used when connecting a DC_PSU_L to an AO board (not depicted). It generally provides weak power delivery to the 12 V rails.
  DC_PSU_M (9): A DC_PSU that was designed for interaction with embodiments of aspects A or B of the present disclosure. It has a dedicated control and monitoring connector with the required signals. It provides strong power delivery to the 12 V rails but in certain use cases insufficient for very power hungry graphics adapter(s) or multiple hard drives.
  PB (8): An external AC/DC switching power brick that delivers DC voltage between 6 V and 48 V (typically 12 V).
  AO: Add-On function with a remote-controllable soft-start switch circuit that listens to and transmits "power good"-information from and to the entire power delivery system. The AO function supplies power to a computer component, typically a graphics adapter or one or more hard drives. The AO function might be a separate board or an integral part of a unified power delivery system. The AO board typically contains an additional pass-through of power to the DC_PSU, which enables one standardized punch-out in the computer chassis. Unless explicitly expressed otherwise, the term AO stands for the soft-start switch part of the board—not the pass-through part.
  CPB: A Common Power Bank (18) is a system that provides suitable DC power to one or a plurality of computer systems. It is powered from a DC supply, an AC supply, a BPS (19), or a generator power source.
  BPS: A Battery Power Source (19) is a system that provides DC power from a battery/s or a battery-backed DC/DC or AC/DC power source. The BPS power is provided to aspect A or to a CPB (18).

6.3 Components in FIGS. 1-8

1. Input stage with connector(s) for power to soft-start switch, optionally including DC/DC converter(s)
2. Soft-start switch, including monitoring sub-circuits such as Over-Voltage Protection (OVP), Under-Voltage Protection (UVP), Over-Current Protection (OCP), and possibly others
3. I/O connector and soft-start switch controller
4. Output connector(s) to graphics adapter, 12 V 5. Input stage with connector for power to DC_PSU, optionally including a DC/DC converter
6. Output connector to DC_PSU, 12 V
7. Power ground connection between DC_PSU and graphics adapter power paths
8. AC/DC power brick with one or more sets of cabling supplying a fixed 6-48 V (typically 12 V)
9. DC_PSU in the form of a stand-alone device
10. Graphics adapter
11. DC/DC converter for 6-48 V input into 12 V (typically multiphase step-down)
12. DC_PSU integrated on a common power delivery board
13. Part of a DC_PSU integrated on a common power delivery board
14. Output connector for connection to motherboard 20- or 24-pin ATX connector
15. Output connector for connection to motherboard 12 V connector
16. Motherboard

6.4 Connections in FIGS. 1-8

A. DC input from PB to DC_PSU supplying a fixed 6-48 V (typically 12 V)
B. DC input from PB to soft-start switched load supplying a fixed 6-48 V (typically 12 V) via one or more separate cablings.
C. Monitoring and control signals in and out
D. DC output to motherboard 20- or 24-pin ATX connector (typically 5 V standby, 3.3 V, 5 V, 12 V, and −12 V)
E. DC output to motherboard 12 V connector
F. DC output to DC_PSU, typically 12 V
G. DC output to graphics adapter (12 V) or hard drives (any combination of 3.3 V, 5 V, and 12 V)
H. AC input to PB, typically in the range of 90 to 265 V and 47 to 63 Hz.

6.5 Components in FIGS. 9-22

1. Input stage with connector(s) for power to soft-start switch (2), optionally including DC/DC converter(s)
2. Soft-start switch, including monitoring sub-circuits such as Over-Voltage Protection (OVP), Under-Voltage Protection (UVP), Over-Current Protection (OCP), and possibly others
3. I/O connector and soft-start switch controller
4. Output connector(s) to graphics adapter (10), 12 V
5. Input stage with connector for power to DC_PSU (9), optionally including a DC/DC converter
6. Output connector to DC_PSU (9), 12 V
7. Power ground connection between DC_PSU (9) and graphics adapter (10) power paths
8. AC/DC power brick with one or more sets of cabling supplying a fixed 6-48 V (typically 12 V)
9. DC_PSU in the form of a stand-alone device
10. Graphics adapter
11. DC/DC converter for 6-48 V input into 12 V (typically multiphase step-down)
12. DC_PSU (9) integrated on a common power delivery board
13. Part of a DC_PSU (9) integrated on a common power delivery board
14. Output connector for connection to motherboard 20- or 24-pin ATX connector
15. Output connector for connection to motherboard 12 V connector
16. Motherboard
17. AO board (dashed outline)
18. CPB, Common Power Bank, optionally with an additional input for power from a generator
19. BPS, Battery Power Source, optionally with an additional input for power from a generator
20. DC power source (PB, CPB, or BPS in any combination) with one or more sets of cabling supplying a fixed 6-48 V (typically 12 V)
21. Computer system

6.6 Connections in FIGS. 9-22

A. DC input from PB (8) to DC_PSU (9) supplying a fixed 6-48 V (typically 12 V)
B. DC input from PB (8) to soft-start switched (2) load supplying a fixed 6-48 V (typically 12 V) via one or more separate cablings.
C. Monitoring and control signals in and out
D. DC output to motherboard 20- or 24-pin ATX connector (typically 5 V standby, 3.3 V, 5 V, 12 V, and −12 V)
E. DC output to motherboard 12 V connector
F. DC output to DC_PSU (9), typically 12 V
G. DC output to graphics adapter (10) (12 V) or hard drives (any combination of 3.3 V, 5 V, and 12 V)
H. AC Input to PB (8), typically AC in the range of 90 to 265 V and 47 to 63 Hz
I. Input/s to DC power source (20), e.g. AC in the range of 90 to 265 V and 47 to 63 Hz, DC (e.g. from a PB (8) or a higher-voltage rail), or AC or DC from a generator.

6.7 Aspect A

There are currently two types of computer power supplies; the traditional AC_PSU metal box (not depicted) and the legacy DC_PSU (DC_PSU_L) (9) connected to an external power brick (PB) (8):

The AC_PSU is in widespread use and can be bought with sufficient power handling capability, even for very power-hungry computers. A drawback is that it is not upgradable—it's an atomic unit, so if you need a more powerful one, you must buy a new one to replace the old. It comes in a variety of shapes in accordance with one of the ATX-related standards, all of which are mounted inside the computer chassis, typically have a more or less noisy cooling fan, and limit the minimum size and design freedom of the computer chassis and the other components inside the box.

Commercially available AC_PSUs tend to require a significantly higher total power rating than what is actually needed by the computer system. This is a question of power distribution over the different power rails (too much made available to the 3.3 V and 5 V rails) and what seems to be an inability to sustain power delivery at great load current changes on the 12 V rail(s), especially at start-up. To some extent this need for over-dimensioning of AC_PSU power places the average load at a point where the efficiency is less than optimal, causing unnecessary losses.

The DC_PSU_L (9) currently on the market is a step forward in the sense that most of the heat generation is moved to the external PB (8) and that the part inside the computer chassis is much smaller. Having only the relatively small DC_PSU_L (9) inside the chassis gives greater freedom when planning the placement (and available size) of the computer components. It is however too weak for gaming computers and file servers.

By implementing a series of design improvements, it is possible to increase the DC_PSU_L's (9) capability so that it can be used for at least 6-disk file servers and aspect A GAC3 gaming computers. Some of these improvements consist of placing bulk capacitors within the DC_PSU (9) (in addition to the ones in the PB or DC power source (20)) and soft-start switching the 12 V rail (as opposed to the commonly used instantaneous high-side turn-on of a P-channel MOSFET transistor which causes an inrush current that might force the PB or DC power source (20) into short-circuit protection). Adding a few additional improvements not further mentioned here, we have a device referred to as a DC_PSU_M (9).

This improved type of solution still suffers from a few natural limitations, most importantly the fact that the PB or DC power source's (20) feedback loop can only tolerate a certain (but unknown) amount of external bulk capacitance before it becomes unstable and unfit to use. Having only one power path from which all loads (10) share the same cabling and external bulk capacitance means that at some point the different loads will drain the DC_PSU_M's (9) energy storage and starve each other out. Even the small resistance and inductance in the cabling is too much of a hindrance to the load transients' sourcing current from the PB or DC power source's (20) bulk capacitors/output stage rather than starving the other loads (10).

6.8 Aspect B

Aspect A mainly relates to power delivery to a single computer system (21). However, there are a number of situations in which you would want a common DC power source (20) for a plurality of computer systems or for protection from power failure.

A set of gaming computers at an internet gaming café would be better fed by a CPB (18) than a number of individual PBs (8). The same is true for computer/server farms that in many cases are already fed from a common Uninterruptible Power Supply (UPS) or BPS (19), so sharing a common power source is close at hand. Fewer components, lower cost, and smaller size are some of the benefits.

Traditional UPS devices typically convert energy stored in batteries into mains-level AC that traditional PSUs are running on. With aspect A, this DC to AC conversion is an unnecessary step that can be eliminated, which results in lower losses, smaller size, lower noise, and lower cost.

6.9 Solutions Enabled by Aspect A and Aspect B

There are two possible types of solution drawn from the insight that the power handling capability can be increased as much as necessary so long as starvation is avoided:

Soft-start switch (2) controlled power paths separated all the way back to (or close to) the output stage/bulk capacitors of the PB or DC power source (20)

Power conversion stage(s) (11) immediately inside the computer chassis

These two approaches have different implications and properties. In both cases the main power is consumed on the 12 V rails into the different loads (including the 12 V rail leaving the DC_PSU (9) itself). The anticipated common case is to supply one or more graphics adapters (10, or 10.1 and 10.2) in this way, but the same principle also applies to file servers with more hard drives than the DC_PSU_M (9) can support.

Aspect A has an AC/DC Power Brick (PB) (8) for a DC power source (20) as this makes most sense for its intended use case. Aspect B adds alternative power sources (Common Power Bank (CPB) (18) and/or a Battery Power Source (BPS) (19)).

While one or a plurality of PBs (8) can be used to power one single computer system, it is equally possible to power one or a plurality of computer systems (21) from one common power bank (CPB) (18), which in its turn can be fed from a DC supply, an AC supply, a generator, or a battery power source (BPS) (19) as described below. This has great practical value for computer/server farms.

Regardless of the number of power sources and computer systems, the ability to use a BPS (19) either as stand-alone battery/s with regulated DC output or as a battery-backed DC/DC or AC/DC power source (possibly also fed from a generator) (commonly referred to as an Uninterruptible Power Supply (UPS)) is expected to be very useful both for individual computers/file servers and for CPBs (19). Please see Brief Description of the Drawings for additional information.

6.10 Separated Soft-Start Switch Controlled Power Paths

Each load gets its power from a path separated all the way back to (or close to) the output stage/bulk capacitors of the PB or DC power source (20), controlled by its own soft-start switch (2).

This is a truly modular approach with natural upgrade paths.

FIG. 1 through 5 illustrate various combinations and upgrade paths, starting with a system that has a GAC1 through GAC3 graphics adapter (FIG. 1) so the AO board is only used for pass-through to the DC_PSU. When the user wants to upgrade to a more powerful graphics adapter, the actual AO board is taken into service (the soft-start switch part). FIG. 2 shows the case where one PB supplies both DC_PSU and AO board via separate cablings, while FIG. 3 shows the pre-existing PB supplying the DC_PSU and an additional PB supplying the AO board.

Similarly, FIG. 9 through 13 illustrate various combinations and upgrade paths, starting with a system that has an aspect A GAC1 through GAC3 graphics adapter (FIG. 9) so the AO board (17) is only used for pass-through to the DC_PSU (9). When the user wants to upgrade to a more powerful graphics adapter, the actual AO board (17) is taken into service (the soft-start switch part (2 and 3)). FIG. 10 shows the case where one DC power source (20) (in this case a PB (8)) supplies both DC_PSU (9) and AO board (17) via separate cablings, while FIG. 11 shows the pre-existing PB (8.1) supplying the DC_PSU (9) and an additional PB (8.2) supplying the AO board (17).

FIGS. 4 and 5 (and similarly FIGS. 12 and 13) illustrate the next upgrade step, to using two graphics adapters (10.1 and 10.2) in Scalable Link Interface (SLI) or Cross-Fire configuration. This requires additional AO board(s) (17.1 and 17.2) and either more PB cabling or more PBs. This approach is scalable far beyond the use of two graphics adapters (10.1 and 10.2).

FIG. 17. shows the equivalent to FIG. 10 with the nomenclature used for aspect B.

FIG. 18. depicts an example of the equivalent to FIG. 12 with an additional BPS (19), in this example powered from AC. This could for example be a battery-backed desktop/workstation/gaming computer/server that must be powered down gracefully in case of a power failure. The combination of aspect A and a BPS (19) enables the smallest, coolest, most energy-efficient, and most quiet computer with a dedicated UPS.

FIG. 19. Illustrates an example of feeding a plurality of computer systems from a CPB (18), in this example powered from AC. The CPB could in this case be a device designed to be a CPB or a very powerful PB (8). It could for example be used for a set of gaming computers at an internet/gaming café, where small size but not battery backup is needed.

In FIG. 20. a BPS (19) fed from both AC and a generator has been added to FIG. 19. This is an example of a small-scale computer/server farm with battery backup.

FIG. 21. Is an example of a larger-scale computer/server farm with a plurality of CPBs (18) fed from AC or e.g. a 48 V DC rail. The individual CPBs would probably be interconnected in some fashion for control and monitoring of operation and possibly also remote start of the individual computer systems.

Lastly, FIG. 22. as an example presents an extension to FIG. 21 in which a plurality of CPBs (18) running on e.g. 48 V DC are fed by an additional BPS (19) supplied from both AC and a generator.

Like in aspect A, it doesn't matter if power source connections (A) or (B) to a computer system come from a common or different DC power sources.

Please note that the purpose of separation between loads is to prevent starvation between loads in situations when it is easier to drain the neighbor/s than to draw energy from the power source shared by these particular loads. Strictly speaking, the connections don't have to be perfectly V-shaped. In fact more or less every practical implementation of aspects A's "Separate power paths all the way back to the output stage/bulk capacitors" is to a certain degree Y-shaped albeit with a comparatively short common stem and very long individual branches.

A group of computer systems connected to a CPB (18) or a BPS (19) are likely to have longer power cables, which makes slightly longer common stems possible without risk of starvation (although the individual branches must still be sufficiently longer in comparison). Hence the revised wording "Soft-start switch controlled power paths separated all the way back to (or close to) the output stage/bulk capacitors of the DC power source". The power paths through the AO board (17) can consist of more than one (typically no more than two) cablings and connectors in parallel, although the illustrations only depict one instance. The reason for this optional parallelization is presented below.

In some cases, one might wish to standardize these connectors and cablings between PB and AO board (including DC_PSU pass-through). It is practical and pedagogic to apply a 1:1 translation between the number of graphics adapter connectors and the number of PB cablings. This means a need for 3+3 pin power cablings, for which the standardized 6-pin PCI-Express connector (Molex part number 45559-0002) is a natural choice. Its pinout is unambiguous and its keying prevents incorrect mating. (A 1:1 translation is not strictly necessary. The number of pins and connectors on the graphics adapters seems to account for use of thinner wires and terminals that are not of high-current type.)

All connectors experience a temperature rise at the point where the male and female terminals attach. Also, the wires themselves heat up slightly. It is advisable to use thick high-quality wires and connector terminals rated for high current (e.g. Molex HCS). According to Molex specifications, up to 30 A can be supplied on one such HCS cabling and 3+3 connector set, but the temperature rise imposes a practical usable range not exceeding the 240 VA limit. The optional parallelization could be used to reduce power loss and temperature rise in use cases where e.g. a more powerful PB (8) was bought than what was initially needed. You should only parallelize cablings from one PB or DC power source (20) for each power path. Connecting multiple PB or DC power sources (20) to the same power path could break the equipment (in particular the PB or DC power source itself) or result in erratic behavior.

The 240 VA limitation is probably less important for computer systems in more industrial or professional installations (such as a server farm), as these are constructed for a specific function in a more controlled environment.

Please note that with much smaller computer chassis and cleverly positioned AO board(s) (17, or 17.1 and 17.2), the cables inside the box are much shorter than the ones used with an AC_PSU (not depicted) in a traditional computer chassis. A great fraction of theses cable and connector losses already occur in AC_PSU computers.

The combined voltage drop in the power path should be compensated for by supplying not 12.0 V but some 12.3 V. The ATX standard states 12 V+/−5% but allows up +/−10% at heavy load. So long as the 12 V lines always stay between 10.8 V and 13.2 V we're safe.

Depending on the type of installation, each cabling output from the PB or DC power source (20) might have a 240 VA Over-Current Protection (OCP), which could be as simple as a fuse. As the AO board (17) detects loss of input power and incorporates its own sophisticated OCP, the 240 VA limitation is met.

In order to establish and maintain a standard that is easily understood by the user and as far as possible avoids user errors, a consistent use of 12 V PBs or DC power sources (20) is advised for connections to the computer systems (21).

It is quite possible to implement a DC/DC converter at the AO board (17) power input(s) and maintain the modular approach, but if the point is to reuse PBs (8) (e.g. from retired laptop computers) that supply another voltage (typically 16 V to 21 V), the number of connector types, polarizations, and potential user errors makes you think twice.

This approach can be used to augment power to both DC_PSU (9) and AC_PSU (not depicted). The DC_PSU_M (9) is designed for this modular concept and the DC_PSU_L (9) and AC_PSU can be used with an additional adapter board (not depicted) that provide the necessary signals (presented below).

6.11 Power Conversion Stage(s) Immediately Inside the Computer Chassis

This approach moves the effective output stage/bulk capacitors closer to the loads, as illustrated in FIG. 6 through 8 and 14 through 16.

While this solution can be used with 12 V PBs or DC power sources (20), it makes most sense to utilize a higher input voltage (24 V or up to 48 V) into a main DC/DC step-down converter (11) that outputs 12 V, eliminating or reducing the need for multiple sets of cabling. At some point you reach a voltage level that could be dangerous to humans and pets if they are exposed to open conduits.

If you want to take advantage of the possibility to use only one input connector, this more or less leaves you with a monolithic design of a series of products with different power rating. There is no clear upgrade path.

The DC/DC-converter incurs an additional cost, needs considerable space, and generates so much heat that it must be cooled by a fan. For high currents, a multi-phase design is more or less the only option, but it has inherently high low-load losses (unless EMI-noisy pulse-skipping or burst mode operation is used).

FIGS. 6 and 7 (and similarly FIGS. 14 and 15) show the use of one common very high-current DC/DC converter at the input, generating 12 V at up to some 50 A. In FIG. 6 the DC/DC converter's inherent soft-start design means that the separate soft-start switches (2) are not necessary for it to function. The problem is that this is in violation of the 240 VA limitation. You might need to add Over-Current Protection (OCP) on each load connector with monitoring of the output voltage and reporting these statuses to the whole power delivery system (not depicted). This brings you very close to FIG. 7 in which the (monitored) soft-start switches (2.1 and 3.1, & 2.2 and 3.2) are brought back.

In FIG. 8 (and similarly in FIG. 16) each output is supplied from its own soft-started DC/DC converter limited to 240 VA. Multiple DC/DC converters cause even higher conversion losses, need even more space, and cost even more money.

The DC power source (20) (or the PB) would need roughly the same number of OCP functions as in the other approach (per computer system), although protection should be provided per wire rather than per connector. As before, the individual DC power source (20) (or PB) OCP function could be a simple fuse.

6.12 Control, Monitoring, and Safety Circuits

An important detail is incorporation of synchronized start-up of all rails, adhering to rise-time and rise-order requirements. It is also advisable to monitor the quality of the power (voltage and current) delivered on each rail, with synchronized emergency shutdown of all rails in case of a failure anywhere in the power delivery system and prevention of start-up in the case when not all power path inputs are energized (A and B). Part of these safety measures are incorporated in the PSU, some in the motherboard, and some in the AO board (17). Each part of the power delivery system is responsible for monitoring its own power path, terminating power delivery in case it detects a failure, receiving the status from the other parts of the power delivery system, and transmitting its own status to the other parts, possibly also comprising a shutdown backup circuit as discussed below.

In some implementations it is beneficial to use the following two types of active-high signals and two types of active-low signals with pull-up resistors to logic high (typically 5 V stand-by):

PS_ON#: The ATX motherboard signals power on (low) or off (high or high-Z) to the PSU or a derivate thereof. At least one PSU supervisor integrated circuit (TPS3510) outputs a control signal (FPO#) that for the present application could be used to perform the same function as PS_ON#. FPO# is an example of a signal derived from PS_ON#.

ENABLE: The inverted derivative of the PS_ON# control signal from the motherboard, such that it can be forced to ground in order to terminate ongoing operation (such as start-up and reboot prevention). It thus provides a means for emergency shutdown of all power delivery.

PS_ON_PROTECTED#: The inverted ENABLE signal passed on to the PSU from the adapter board.

PWR_OK: The ATX status indicator. It is pulled low by any part of the power delivery system when one of its rails fails to provide appropriate voltage and current. The motherboard reacts by terminating operation and releasing PS_ON#.

The AC_PSU (not depicted) and the DC_PSU_L (9) should use an adapter board connected between the motherboard 20- or 24-pin connector and the PSU connector. It inverts PS_ON# into ENABLE, inverts ENABLE into PS_ON_PROTECTED#, and brings out ENABLE, PWR_OK, and optionally PS_ON# signals to the control and monitoring connector. The DC_PSU_M (9) is designed so that these three signals and connector are integrated on the DC_PSU_M (9) itself, which means that an adapter board is not necessary.

6.13 Start-Up Prevention

By implementing a circuit that acts as a normally closed relay, it is possible to short ENABLE and PWR_OK to ground when the power input is not energized and to release these signals (to be pulled up) when the power input is energized. Alternatively, a P-channel depletion mode MOSFET performs the same function.

6.14 Equipment Protection in Case of Invalid Input Power Disconnection

A power failure mode that is unique to the modular design is the case of a DC power input connector being disconnected when the computer is running. The start-up prevention protection covers this case by abruptly turning off power delivery (by shorting ENABLE to ground), which should be sufficient for preventing equipment from breaking.

6.15 Power Delivery Failure Signaling and Emergency Shutdown

The PWR_OK signal is pulled low by any part of the power delivery system in case of a failure during normal on-going operation. This is detected by the motherboard that immediately releases PS_ON#, which turns off power delivery. This provides a form of inherent emergency shutdown.

It is possible but perhaps not necessary to implement a backup circuit in the AO board (17) that pulls ENABLE low if the AO board (17) detects PWR_OK going low while PS_ON# is held low by the motherboard (i.e. the moment just before the motherboard releases PS_ON#). In more detail:

1. The motherboard pulls PS_ON# low in order to start-up the computer. PWR_OK is initially held low by the power delivery system.
2. The power delivery system tries to start up all rails.
3. After a certain short period the safety feature checks the outcome:
   a. If PWR_OK is still pulled low it means that there is a power delivery system failure. ENABLE is pulled low until the motherboard releases PS_ON#.
   b. If PWR_OK has gone high, the safety feature waits for PWR_OK going low. If this happens while PS_ON# is held low by the motherboard, ENABLE is pulled low until the motherboard releases PS_ON#.

So far it's simple. The thing is that many motherboards automatically retry indefinitely, which could be a problem in case of a hardware malfunction. The difficult question is whether an additional safety feature should be implemented; reboot prevention.

6.16 Reboot Prevention

Depending on what caused PWR_OK to be pulled low, a reboot can either be the most practical to the user or completely unwanted. If we had an Under-Voltage Condition (UVC) it could be because we were e.g. using a PB or DC power source (20) of insufficient power rating, tried over-clocking too aggressively, or experienced a short AC line drop. In these cases we want the computer to reboot automatically. On the other hand, if we had any type of error due to a breakdown in a component in the computer or in the power delivery system, we would want the entire power delivery system to remain shut off. As far as the inventor knows, AC_PSUs don't generally keep track of what went wrong, so they typically let the motherboard decide whether to reboot, which it seems to generally do.

The additional safety feature is an optional latch that keeps ENABLE low after the backup circuit has triggered. It's necessary to power cycle the input power of the part of the power delivery system that is holding the latch in order to make it release it. This is a new type of safety feature for computer power supplies.

6.17 Further Considerations Regarding Aspects A and B

In some embodiments, Aspect A makes it possible to build very small and powerful gaming computers, graphical workstations, and file servers. The AC_PSU is no longer the only option, which frees valuable space inside the computer chassis and gives greater layout freedom in the chassis. It is easy to build standard-component computers that are 33% to 50% smaller by using embodiments disclosed herein. This reduces the computer to a size at which it is portable; a powerful gaming computer that is small enough to put in the hand luggage. As a further example, it can be placed by the living-room TV for social Virtual Reality (VR) gaming, in addition to all the present areas of use.

The modular concept of aspect A makes it possible for the owner to upgrade from using only a DC_PSU (9) and a PB (8) without an AO board (17) to using the same DC_PSU (9) and PB (8) together with one or more AO boards (17, or 17.1 and 17.2) and PBs (8, or 8.1 and 8.2), simply adding equipment and not throwing away the pre-existing equipment. This is of great economic and environmental value. It is even possible to augment the power handling capability of an AC_PSU in this way.

Aspect B adds alternative DC power sources (Common Power Bank (CPB) (18) and/or a Battery Power Source (BPS) (19)), to the Power Brick (PB) (8) of aspect A, which has great practical value for computer/server farms and/or computer systems that must be shutdown gracefully in case of a power failure.

6.18 Enumerated Example Embodiments

1. A soft-start switch circuit, working in conjunction with a pre-existing computer power delivery system or being an integral part of such a system, for power delivery to at least one component of a computer, comprising at least one separated power supply path; wherein the soft-start switch circuit is configured to:
   receive command/s to activate or deactivate power delivery to the at least one computer component;
   output a voltage ramped up to a fixed level to the at least one computer component on the at least one separated power supply path when the activation command is received;
   discontinue power delivery when the deactivation command is received; and
   receive and transmit a signal stating whether an adequate voltage and current level is received by the at least one computer component.
2. The soft-start switch circuit according to example embodiment 1, further configured to discontinue power delivery when it detects a voltage or current delivery failure in its power path and transmit this information to the other parts of the power delivery system.
3. The soft-start switch circuit according to any of example embodiments 1-2, wherein the output voltage is ramped up to 12 Volt when the power delivery is provided to at least one graphics adapter; and ramped up to any combination of 3.3 Volt, 5 Volt, and 12 Volt when the power delivery is provided to at least one hard drive.
4. The soft-start switch circuit according to any of example embodiments 1-3, further comprising any combination of protection circuits for:
   start-up prevention by prohibiting the activation command when not all power inputs are energized;
   invalid power disconnection protection by enforcing the deactivation command when one power input loses power during on-going operation;
   emergency shutdown by enforcing the deactivation command when a signal stating power delivery failure is received; and
   reboot prevention by latching the enforced deactivation command when a signal stating power delivery failure is received, and by releasing this latch when the input power is cycled.
5. The soft-start switch circuit according to any of example embodiments 1-5, wherein:
   the activation command is implemented as an active-high signal bus with pull-up to logic high, where activation is effectuated when no part of the power delivery system is forcing this signal low, further referred to as ENABLE;
   the deactivation command is implemented as the ENABLE signal being forced low; and
   prohibiting the activation command and enforcing the deactivation command both mean that the ENABLE signal is being forced low.
6. An add-on board comprising a soft-start switch circuit according to any of example embodiments 1-5.
7. A computer power delivery system comprising at leats one soft-start switch circuit according to any of example embodiments 1-5.
8. A method by which a soft-start switch circuit, working in conjunction with a pre-existing computer power delivery system or being an integral part of such a system, is used for power delivery to at least one component of a computer, comprising:
   receiving command/s to activate or deactivate power delivery to the at least one computer component;
   outputting a voltage ramped up to a fixed level to the at least one computer component on the at least one separated power supply path when the activation command is received;
   discontinuing power delivery when the deactivation command is received; and
   receiving and transmitting a signal stating whether an adequate voltage and current level is received by the at least one computer component.
9. The method according to example embodiment 8, further comprising:

discontinuing power delivery when detecting a voltage or current delivery failure in its power path and transmitting this information to the other parts of the power delivery system.
10. The method according to any of example embodiments 8-9, further comprising any combination of the following measures of protection:
providing start-up prevention by prohibition of the activation command when not all power inputs are energized;
providing invalid power disconnection protection by enforcement of the deactivation command when one power input loses power during on-going operation;
providing emergency shutdown by enforcement of the deactivation command when a signal stating power delivery failure is received; and
providing reboot prevention by latching the enforced deactivation command when a signal stating power delivery failure is received, and by releasing this latch when the input power is cycled.
11. The method according to any of example embodiments 8-10, further comprising:
inverting the ATX standard control signal PS_ON# from the motherboard into an active-high pulled-up activation signal further referred to as ENABLE, or in any other way producing the ENABLE signal from a derivation of PS_ON# from for example, but not limited to, the output of a PSU supervisor circuit;
inverting the ENABLE signal into a signal further referred to as PS_ON_PROTECTED# sent to the power supply control unit; and
distributing the ENABLE signal as a bus to all parts of the power delivery system for synchronized activation and deactivation, thereby providing a means for any part of the power delivery system to force system-wide discontinuation of power delivery.
12. A system for power delivery to a plurality of components of a computer, comprising:
a plurality of soft-start switch circuits according to any of example embodiments 1-7;
a plurality of computer components, each connected to a respective soft-start switch circuit according to any of example embodiments 1-7, on a separated power path.
13. A soft-start switch circuit (2 and 3), working in conjunction with a pre-existing computer power delivery system or being an integral part of such a system, for power delivery to at least one component of a computer, comprising at least one separated power supply path; which is separated all the way back to (or close to) an output stage/bulk capacitors of a DC power source (20), wherein the component gets its power from the separated power supply path; and wherein each part of the computer power delivery system is responsible for monitoring its own power path, receiving the status from other parts of the computer power delivery system, and transmitting its own status to other parts; wherein the soft-start switch circuit (2 and 3) is configured to:
receive command/s (via C) to activate or deactivate power delivery to the at least one computer component (e.g. 10);
output a voltage ramped up to a fixed level to the at least one computer component (e.g. 10) on the at least one separated power supply path (B to G) when the activation command is received (via C);
discontinue power delivery when the deactivation command is received (via C); and
receive and transmit a signal (via C) stating whether an adequate voltage and current level is received by the at least one computer component (e.g. 10).
14. The soft-start switch circuit (2 and 3) according to example embodiment 13, wherein the DC power source (20) comprises a battery power source (19), configured to supply one to a plurality of computer systems.
15. The soft-start switch circuit (2 and 3) according to example embodiment 13, wherein the DC power source (20) comprises a common power bank (20), configured to supply one to a plurality of computer systems.
16. The soft-start switch circuit (2 and 3) according to any one of example embodiments 13-15, wherein the DC power source (20) is based on Direct Current.
17. The soft-start switch circuit (2 and 3) according to any one of example embodiments 13-15, wherein the DC power source (20) is based on Alternating Current.
18. The soft-start switch circuit (2 and 3) according to any one of example embodiments 13-17, further configured to discontinue power delivery when it detects a voltage or current delivery failure in its power supply path (B to G) and to transmit this information to the other parts of the power delivery system (via C).
19. The soft-start switch circuit (2 and 3) according to any one of example embodiments 13-18, wherein the output voltage is ramped up to 12 Volt when the power delivery is provided to at least one graphics adapter (10); and ramped up to any combination of 3.3 Volt, 5 Volt, and 12 Volt when the power delivery is provided to at least one hard drive.
20. The soft-start switch circuit (2 and 3) according to any one of example embodiments 13-19, further comprising any combination of protection circuits for:
start-up prevention by prohibiting the activation command when not all power inputs (A and B) are energized;
invalid power disconnection protection by enforcing the deactivation command when one power input loses power during on-going operation (A or B);
emergency shutdown by enforcing the deactivation command when a signal stating power delivery failure is received (via C); and
reboot prevention by latching the enforced deactivation command when a signal stating power delivery failure is received (via C), and by releasing this latch when the input power is cycled.
21. The soft-start switch circuit (2 and 3) according to any one of example embodiments 13-20, wherein:
the activation command is implemented as an active-high signal bus (C) with pull-up to logic high, where activation is effectuated when no part of the power delivery system is forcing this signal low, further referred to as ENABLE;
the deactivation command is implemented as the ENABLE signal being forced low; and
prohibiting the activation command and enforcing the deactivation command both mean that the ENABLE signal is being forced low.
22. An add-on board (17) comprising a soft-start switch circuit (2 and 3) according to any one of example embodiments 13-21.
23. An adapter board connected between the motherboard 20- or 24-pin connector and the PSU connector, inverting PS_ON# into ENABLE, inverting ENABLE into PS_ON_PROTECTED#, and bringing out ENABLE, PWR_OK, and optionally PS_ON# signals to the control and monitoring connector, thereby enabling use of AC_PSU and DC_PSU_L (9) with the soft-start switch circuit (2 and 3) according to any one of example embodiments 13-21.

24. A computer power delivery system comprising at least one soft-start switch circuit (2 and 3) according to any one of example embodiments 13-21.

25. A method by which a soft-start switch circuit (2 and 3), working in conjunction with a pre-existing computer power delivery system or being an integral part of such a system, is used for power delivery to at least one component (e.g. 10) of a computer, comprising at least one separated power supply path, which is separated all the way back to (or close to) the output stage/bulk capacitors of the DC power source (20), wherein the component gets its power from the separated power supply path; and wherein each part of the computer power delivery system is responsible for monitoring its own power path, receiving the status from other parts of the computer power delivery system, and transmitting its own status to other parts; which method comprises:
    receiving command/s (via C) to activate or deactivate power delivery to the at least one computer component (e.g. 10);
    outputting a voltage ramped up to a fixed level to the at least one computer component (e.g. 10) on the at least one separated power supply path (B to G) when the activation command is received (via C);
    discontinuing power delivery when the deactivation command is received (via C); and
    receiving and transmitting a signal (via C) stating whether an adequate voltage and current level is received by the at least one computer component (e.g. 10).

26. The method according to example embodiment 25, wherein the DC power source (20) comprises a battery power source (19), configured to supply one to a plurality of computer systems.

27. The method according to example embodiment 25, wherein the DC power source (20) comprises a common power bank (18), configured to supply one to a plurality of computer systems.

28. The method according to any one of example embodiments 25-27, wherein the DC power source (20) is based on Direct Current.

29. The method according to any one of example embodiments 25-27, wherein the DC power-source (20) is based on Alternating Current.

30. The method according to any one of example embodiments 25-29, further comprising:
    discontinuing power delivery when detecting a voltage or current delivery failure in its power supply path (B to G) and transmitting this information to the other parts of the power delivery system (via C).

31. The method according to any one of example embodiments 25-30, further comprising any combination of the following measures of protection:
    providing start-up prevention by prohibition of the activation command when not all power inputs are energized;
    providing invalid power disconnection protection by enforcement of the deactivation command (via C) when one power input (A or B) loses power during on-going operation;
    providing emergency shutdown by enforcement of the deactivation command when a signal stating power delivery failure is received (via C); and
    providing reboot prevention by latching the enforced deactivation command when a signal stating power delivery failure is received (via C), and by releasing this latch when the input power is cycled.

32. The method according to any one of example embodiments 25-31, further comprising:
    inverting the ATX standard control signal PS_ON# from the motherboard (16) into an active-high pulled-up activation signal further referred to as ENABLE, or in any other way producing the ENABLE signal from a derivation of PS_ON# from for example, but not limited to, the output of a PSU supervisor circuit;
    inverting the ENABLE signal into a signal further referred to as PS_ON_PROTECTED# sent to the power supply control unit (via C); and
    distributing the ENABLE signal as a bus (via C) to all parts of the power delivery system for synchronized activation and deactivation, thereby providing a means for any part (2, 3, 9) of the power delivery system to force system-wide discontinuation of power delivery.

33. A system for power delivery to a plurality of components (e.g. 10) of a computer, comprising:
    a plurality of soft-start switch circuits (2 and 3) according to any of example embodiments 13-21;
    a plurality of computer components (e.g. 10), each connected to a respective soft-start switch circuit (2 and 3) according to any of example embodiments 13-21, on a separated power supply path (A to F, and B to G); or to an adapter board according to example embodiment 23.

What is claimed is:

1. A soft-start switch circuit, working in conjunction with a computer power delivery system or being an integral part of such a system, wherein the soft-start switch circuit is configured to provide power delivery to at least one component of a computer, the soft-start switch circuit comprising:
    a soft-start switch electrically coupled in a first separated power supply path between a DC power source and the at least one component of the computer so that the first separated power supply path is separated all the way back to the DC power source, wherein the soft-start switch circuit is configured to,
    receive an activation command to activate power delivery to the at least one component of the computer,
    output a voltage ramped up to a fixed level to the at least one component of the computer by turning the soft-start switch on responsive to receiving the activation command,
    receive a deactivation command to deactivate power delivery to the at least one component of the computer,
    discontinue power delivery from the DC Power source to the at least one component of the computer by turning the soft-start switch off responsive to receiving the deactivation command, and
    transmit a signal indicating whether an adequate voltage and current level is received by the at least one component of the computer;
    wherein a second separated power supply path is provided for a power supply unit for a motherboard of the computer, wherein the first separated power supply path is separated from the second separated power supply path all the way back to the DC power source.

2. The soft-start switch circuit according to claim 1, wherein the DC power source comprises a power brick, wherein the first separated power supply path is separated from the second separated power supply path all the way back to, or close to, an output stage/bulk capacitors of the power brick, wherein the at least one component gets its power from the power brick and the first separated power supply path through the soft-start switch; and wherein each part of the computer power delivery system is responsible for monitoring its own power path, receiving the status from other parts of the computer power delivery system, and transmitting its own status to other parts.

3. The soft-start switch circuit according to claim 1, wherein the first separated power supply path is separated from the second separated power supply path all the way back to, or close to, an output stage/bulk capacitors of the DC power source, wherein the at least one component gets its power from the DC power source and the first separated power supply path through the soft-start switch; and wherein each part of the computer power delivery system is responsible for monitoring its own power path, receiving the status from other parts of the computer power delivery system, and transmitting its own status to other parts.

4. The soft-start switch circuit according to claim 1, wherein:

the DC power source comprises a battery power source configured to supply one to a plurality of computer systems; or the DC power source comprises a common power bank, configured to supply one to a plurality of computer systems.

5. The soft-start switch circuit according to claim 1, wherein:

the DC power source is based on Direct Current; or the DC power source is based on Alternating Current.

6. The soft-start switch circuit according to claim 1, wherein the soft-start switch is further configured to, discontinue power delivery to the at least one component of the computer when a voltage or current delivery failure in its power supply path is detected and to transmit information indicating the voltage or current delivery failure to other parts of the power delivery system;

output the voltage ramped up to 12 Volt when the power delivery is provided to the at least one component of the computer being at least one graphics adapter; and/or output the voltage ramped up to any combination of 3.3 Volt, 5 Volt, and 12 Volt when the power delivery is provided to the at least one component of the computer being at least one hard drive.

7. The soft-start switch circuit according to claim 1, further comprising any combination of protection circuits configured to provide any of, start-up prevention by prohibiting the activation command when not all power inputs are energized, invalid power disconnection protection by enforcing the deactivation command when one power input loses power during on-going operation, emergency shutdown by enforcing the deactivation command when a signal stating power delivery failure is received, and reboot prevention by latching the enforced deactivation command when a signal stating power delivery failure is received, and by releasing this latch when the input power is cycled.

8. The soft-start switch circuit according to claim 1, wherein:

the activation command is implemented as an active-high signal bus with pull-up to logic high, where activation is effectuated when no part of the power delivery system is forcing this signal low, further referred to as an ENABLE signal;

the deactivation command is implemented as the ENABLE signal being forced low; and prohibiting the activation command and enforcing the deactivation command both mean that the ENABLE signal is being forced low.

9. An add-on board comprising a soft-start switch circuit according to claim 1.

10. An adapter board connected between a 20- or 24-pin connector of the motherboard and a PSU connector, inverting PS_ON# into ENABLE, inverting ENABLE into PS_ON_PROTECTED#, and bringing out ENABLE, PWR_OK, and optionally PS_ON# signals to a control and monitoring connector, thereby enabling use of AC_PSU and DC_PSU_L with the soft-start switch circuit according to claim 1.

11. The soft-start switch circuit of claim 1, wherein the second separated power supply path is provided between the DC power source and the power supply unit for the motherboard so that the second separated power supply path is separated from the first separated power supply path all the way back to the DC power source, or wherein the second separated power supply path is provided between a second DC power source and the power supply unit for the motherboard so that the second separated power supply path is separated from the first separated power supply path all the way back to the second DC power source.

12. A method by which a soft-start switch circuit, working in conjunction with a computer power delivery system or being an integral part of such a system, is used to provide power delivery to at least one component of a computer, the soft-start switch circuit comprising a first separated power supply path from a DC power source via a soft-start switch to the at least one component of the computer, and wherein a second separated power supply path is provided for a power supply unit for a motherboard of the computer such that the first power supply path is separated from the second power supply path all the way back to the DC power source, the method comprising:

receiving an activation command to activate power delivery to the at least one component of the computer;

outputting a voltage ramped up to a fixed level to the at least one component of the computer by turning the soft-start switch on responsive to receiving the activation command;

receiving a deactivation command to deactivate power delivery to the at least one component of the computer;

discontinuing power delivery to the at least one component of the computer by turning the soft-start switch off responsive to receiving the deactivation command; and transmitting a signal indicating whether an adequate voltage and current level is received by the at least one component of the computer.

13. The method according to claim 12, wherein the DC power source comprises a power brick, wherein the first separated power supply path is separated from the second separated power supply path all the way back to, or close to, an output stage/bulk capacitors of the power brick, wherein the at least one component gets its power from the power brick and the first separated power supply path through the soft-start switch; and wherein each part of the computer power delivery system is responsible for monitoring its own power path, receiving the status from other parts of the computer power delivery system, and transmitting its own status to other parts.

14. The method according to claim 12, wherein the first separated power supply path is separated from the second separated power supply path all the way back to, or close to, an output stage/bulk capacitors of the DC power source, wherein the at least one component gets its power from the DC power source and the first separated power supply path through the soft-start switch; and wherein each part of the computer power delivery system is responsible for monitoring its own power path, receiving the status from other parts of the computer power delivery system, and transmitting its own status to other parts.

15. The method according to claim 12, wherein:
the DC power source comprises a battery power source, configured to supply one to a plurality of computer systems; or
the DC power source comprises a common power bank, configured to supply one to a plurality of computer systems.

16. The method according to claim 12, wherein:
the DC power source is based on Direct Current; or
the DC power source is based on Alternating Current.

17. The method according to claim 12, further comprising:
discontinuing power delivery to the at least one component of the computer when a voltage or current delivery failure in its power supply path is detected and transmitting information indicating the voltage or current delivery failure to other parts of the power delivery system.

18. The method according to claim 12, further comprising any combination of:

providing start-up prevention by prohibition of the activation command when not all power inputs are energized;
providing invalid power disconnection protection by enforcement of the deactivation command when one power input loses power during on-going operation;
providing emergency shutdown by enforcement of the deactivation command when a signal stating power delivery failure is received; and
providing reboot prevention by latching the enforced deactivation command when a signal stating power delivery failure is received, and by releasing this latch when the input power is cycled.

19. The method according to claim 12, further comprising:
inverting an ATX standard control signal PS_ON# from the motherboard into an active-high pulled-up activation signal further referred to as an ENABLE signal, or in any other way producing the ENABLE signal from a derivation of the PS_ON# signal;
inverting the ENABLE signal into a signal further referred to as PS_ON_PROTECTED# sent to a power supply controller; and
distributing the ENABLE signal as a bus to all parts of the power delivery system to provide synchronized activation and deactivation, so that any part of the power delivery system can force system-wide discontinuation of power delivery.

20. The method of claim 12, wherein the second separated power supply path is provided between the DC power source and the power supply unit for the motherboard so that the second separated power supply path is separated from the first separated power supply path all the way back to the DC power source, or wherein the second separated power supply path is provided between a second DC power source and the power supply unit for the motherboard so that the second separated power supply path is separated from the first separated power supply path all the way back to the second DC power source.

* * * * *